United States Patent
Baker et al.

(10) Patent No.: US 11,041,762 B2
(45) Date of Patent: Jun. 22, 2021

(54) CONTROL OF MOTORIZED WINDOW TREATMENTS AND LIGHTING COLOR

(71) Applicant: Lutron Technology Company LLC, Coopersburg, PA (US)

(72) Inventors: Rhodes B. Baker, Bethlehem, PA (US); Craig Alan Casey, Coopersburg, PA (US); Thomas M. Shearer, Macungie, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 16/560,897

(22) Filed: Sep. 4, 2019

(65) Prior Publication Data

US 2020/0072674 A1 Mar. 5, 2020

Related U.S. Application Data

(60) Provisional application No. 62/726,839, filed on Sep. 4, 2018.

(51) Int. Cl.
| | |
|---|---|
| *H05B 47/11* | (2020.01) |
| *G01J 5/02* | (2006.01) |
| *E06B 9/42* | (2006.01) |
| *E06B 9/72* | (2006.01) |
| *G01J 5/60* | (2006.01) |
| *E06B 9/68* | (2006.01) |

(52) U.S. Cl.
CPC ............... *G01J 5/027* (2013.01); *E06B 9/42* (2013.01); *E06B 9/72* (2013.01); *G01J 5/60* (2013.01); *H05B 47/11* (2020.01); *E06B 2009/6818* (2013.01); *E06B 2009/6827* (2013.01)

(58) Field of Classification Search
None
See application file for complete search history.

(56) References Cited

U.S. PATENT DOCUMENTS

| | | | |
|---|---|---|---|
| 5,467,266 | A | 11/1995 | Jacobs et al. |
| 7,391,297 | B2 | 6/2008 | Cash et al. |
| 8,786,236 | B2 | 7/2014 | Spira et al. |
| 8,950,461 | B2 | 2/2015 | Ogden, Jr. et al. |
| 9,488,000 | B2 | 11/2016 | Kirby et al. |

(Continued)

FOREIGN PATENT DOCUMENTS

EP 2680671 A2 1/2014

*Primary Examiner* — Amy Cohen Johnson
*Assistant Examiner* — Jianzi Chen
(74) *Attorney, Agent, or Firm* — Condo Roccia Koptiw LLP

(57) ABSTRACT

Color temperature in a space may be adjusted by controlling lighting control devices and motorized window treatments. A position of a motorized window treatment may be controlled based on a control mode or user preference. Outside color temperature values may be limited from entering the space by closing the shade fabric of the motorized window treatment when the outside color temperature exceeds a threshold. A color temperature of outside light entering the space may be determined after the shades are adjusted. The color temperature of outside light entering the space may be determined by considering the shade fabric characteristics. The color temperature of light emitted by one or more lighting fixtures may be adjusted based on the color temperature of the light entering the space.

29 Claims, 14 Drawing Sheets

(56) References Cited

U.S. PATENT DOCUMENTS

| | | |
|---|---|---|
| 9,538,603 B2 | 1/2017 | Abraham et al. |
| 9,674,917 B1 | 6/2017 | Sooch et al. |
| 2008/0092075 A1 | 4/2008 | Jacob et al. |
| 2013/0030589 A1 | 1/2013 | Pessina et al. |
| 2014/0265568 A1 | 9/2014 | Crafts et al. |
| 2017/0038787 A1* | 2/2017 | Baker .................... H04W 4/33 |
| 2017/0238392 A1* | 8/2017 | Shearer ................. H05B 45/20 315/153 |
| 2018/0168020 A1 | 6/2018 | Casey et al. |

* cited by examiner

CONTROL OF MOTORIZED WINDOW TREATMENTS AND LIGHTING COLOR

CROSS-REFERENCE TO RELATED APPLICATIONS

This application claims the benefit of U.S. Provisional Application Ser. No. 62/726,839, filed Sep. 4, 2018, the entirety of which is incorporated by reference herein.

BACKGROUND

Traditional sources of light such as the Sun (and later incandescent lights) may exhibit the characteristics of a black body radiator. Such light sources typically emit a relatively continuous-spectrum of light, and the continuous emissions range the entire bandwidth of the visible light spectrum (e.g., light with wavelengths between approximately 390 nm and 700 nm). The human eye has grown accustomed to operating in the presence of black body radiators and has evolved to be able to distinguish a large variety of colors when emissions from a black body radiator are reflected off of an object of interest. Various wavelengths/frequencies of the visible light spectrum may be associated with a given "color temperature" of a black body radiator.

Traditional load control environments may include non-incandescent light sources such as fluorescent lights (e.g., compact fluorescent lights or CFLs) and light emitting diodes (LEDs), which have become more widely available due to their relative power savings as compared to traditional incandescent lamps. The color temperature of the light emitted from CFLs or LEDs may be controlled to exhibit a desired color temperature within the space having similar properties to a black body radiator at certain times of day. The color temperature of the light emitted from CFLs or LEDs may also be controlled in response to preprogrammed modes of operation or user preference to achieve a desired color temperature value.

Load control environments may also include daylight control devices, such as automated window shades, which may also affect the color temperature of the light within the space. As the automated window shades open and close, the color temperature value within the space may be affected and the desired color temperature value may be prevented from being achieved.

SUMMARY

Systems, methods, and apparatus are described for controlling color temperature in a space. The color temperature within a space may be affected by the color temperature of the light emitted by a lighting fixture and/or the color temperature of light entering the space from outside of the space (e.g., through a window). The color temperature of the light emitted by the lighting fixtures may be controlled with the position of the window treatment fabric of a motorized window treatment in the space to achieve a setpoint color temperature value (e.g., desired color temperature) in the space.

A position of the window treatment fabric of a motorized window treatment may be controlled based on a control mode or user preference. The different color temperature thresholds may correspond to different control modes or the user preferences. The motorized window treatment may include multiple types of shade fabric. For example, the motorized window treatment may include blackout fabrics, warm sheer fabrics, and/or cool sheer fabrics. Each of the shade fabrics may have a corresponding color temperature threshold for enabling control of the shade fabric.

The position of the window treatment fabric of the motorized window treatment may be determined based on a color temperature threshold and a color temperature of daylight outside the space. The color temperature of the light outside the space may be measured by an outside color temperature sensor. The position of the window treatment fabric of the motorized window treatment may be closed when the color temperature of the light outside the space is greater than the color temperature threshold. The color temperature threshold may include a low color temperature threshold and a high color temperature threshold. The position of the window treatment fabric of the motorized window treatment may be closed when the color temperature of the daylight outside the space is greater than a low color temperature threshold and less than a high color temperature threshold.

After controlling the shades, a color temperature of daylight entering the space may be determined for controlling the color temperature of the light emitted by the lighting fixtures. The color temperature of the light entering the space may be determined based on the position of the window treatment fabric of the motorized window treatment and at least one characteristic of shade fabric associated with the motorized window treatment. The at least one characteristic may comprise an openness factor or a color.

The color temperature of the light emitted by one or more lighting fixtures may be adjusted based on the color temperature of the daylight entering the space. The color temperature of light emitted by one or more lighting fixtures may be decreased when the color temperature of the light entering the space is greater than a setpoint color control temperature. The color temperature of light emitted by one or more lighting fixtures may be increased when the color temperature of the light entering the space is less than a setpoint color control temperature.

The color temperature of light entering the space and/or the light emitted by one or more lighting fixtures may be measured by an interior color temperature sensor in the space. The interior color temperature sensor may be located on the lighting fixture or may be external to the lighting fixture (e.g., a room color temperature sensor).

DETAILED DESCRIPTION

Figure 1:
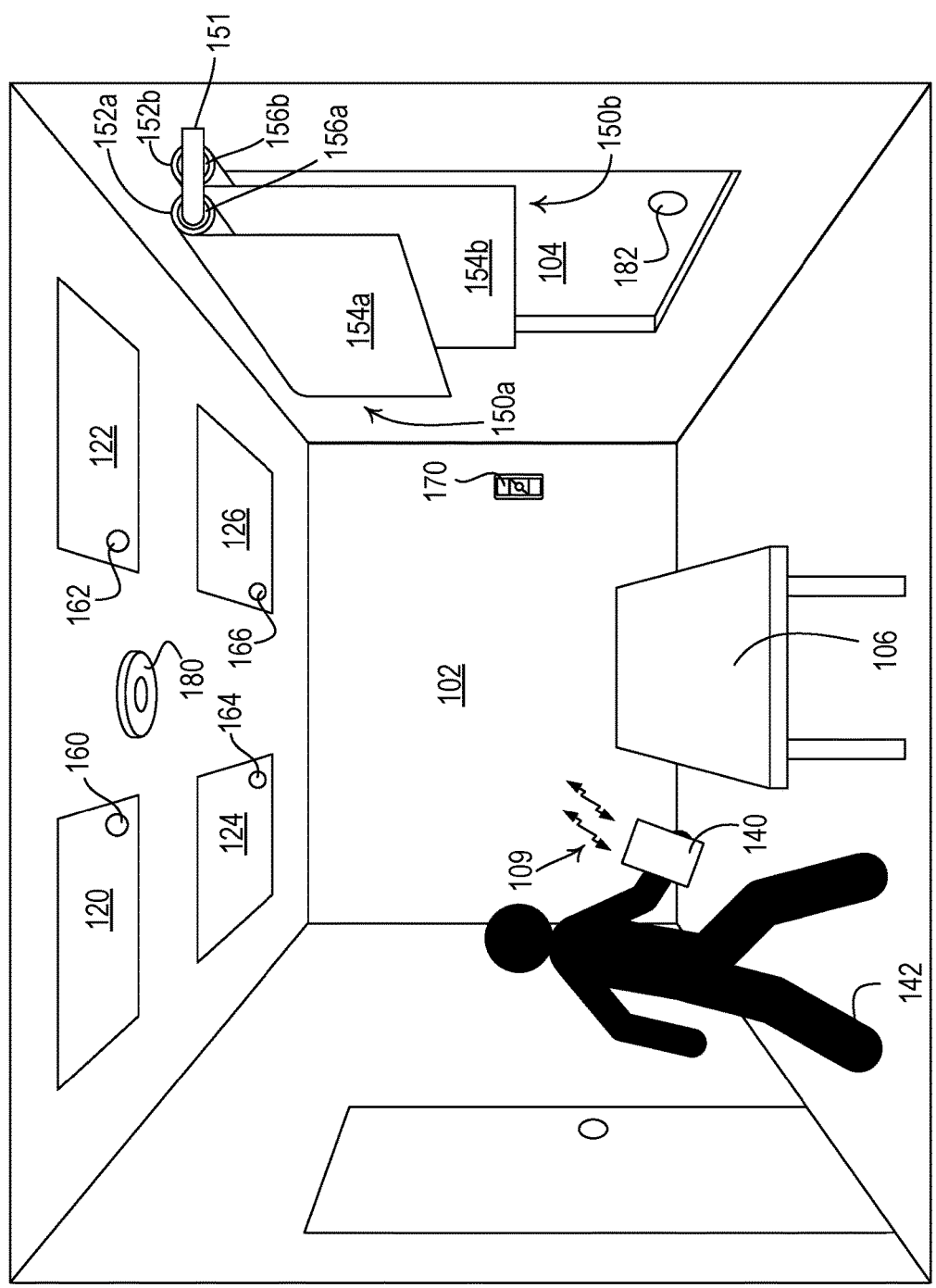
FIG. 1 is a diagram of an example load control system for controlling one or more load control devices.

FIG. 1 is a diagram of an example load control system 100 for controlling one or more load control devices. The load control system 100 may be installed in a room 102 of a building. The load control system 100 may comprise a plurality of control devices configured to communicate with each other via wireless signals, e.g., radio-frequency (RF) signals 108. Alternatively, or additionally, the load control system 100 may comprise a wired digital communication link coupled to one or more of the control devices to provide for communication between the control devices.

The control devices of the load control system 100 may comprise a number of control-source devices (e.g., input devices operable to transmit messages (e.g., digital messages) in response to user inputs, changes in measured light intensity, etc.) and/or a number of control-target devices (e.g., load control devices operable to receive messages and control respective electrical loads in response to the received messages). A single control device of the load control system 100 may operate as both a control-source and a control-target device.

The control-source devices may be configured to transmit messages directly to the control-target devices. In addition, the load control system 100 may comprise a system controller 110 (e.g., a central processor or load controller) operable to communicate messages to and/or from the control devices (e.g., the control-source devices and/or the control-target devices). For example, the system controller 110 may be configured to receive messages from the control-source devices and transmit messages to the control-target devices in response to the messages received from the control-source devices. The control-source devices, the control-target devices, and the system controller 110 may be configured to transmit and receive the RF signals 108 using a proprietary RF protocol, such as the ClearConnect® protocol. Alternatively, the RF signals 108 may be transmitted using a different RF protocol, such as, a standard protocol, for example, one of WIFI, ZIGBEE, Z-WAVE, KNX-RF, THREAD, ENOCEAN RADIO protocols, or another protocol.

The control-target devices in the load control system 100 may comprise lighting control devices located within lighting fixtures 120-126. The lighting control devices in the lighting fixtures 120-126 may be light-emitting diode (LED) drivers for driving an LED light source (e.g., an LED light engine). The LED drivers may be located in or adjacent to the lighting fixtures 120-126. Each LED driver may be configured to receive messages via the RF signals 108 (e.g., from the system controller 110 or directly from a control-source device) and to control the LED light source in response to the received messages. The LED driver may be configured to adjust the intensity and/or color (e.g., color temperature) of the LED light source in response to the received messages. Examples of LED drivers configured to control the color temperature of LED light sources are described in greater detail in commonly-assigned U.S. Pat. No. 9,538,603, issued Jan. 3, 2017, entitled SYSTEMS AND METHODS FOR CONTROLLING COLOR TEMPERATURE, the entire disclosure of which is hereby incorporated by reference. One or more other example LED drivers may be used.

The LED drivers within lighting fixtures 120-126 may adjust the color temperature of the LED light sources to change the color temperature based on the time of day and/or different modes of operation. For example, the LED drivers may adjust the color temperature of the LED light sources to mimic the color temperature during sunrise and sunset at the appropriate times of day, month, season, etc. An example of a load control system that is configured to present a "natural show" to mimic the color temperature of daylight conditions is described in greater detail in U.S. Pat. No. 9,674,917, issued Jun. 6, 2017, entitled ILLUMINATION SYSTEM AND METHOD THAT PRESENTS A NATURAL SHOW TO EMULATE DAYLIGHT CONDITIONS WITH SMOOTHING DIMCURVE MODIFICATION THEREOF, the entire disclosure of which is hereby incorporated by reference. One or more other example load control systems may be implemented. In an example embodiment, the LED drivers within the lighting fixtures 120-126 may control the color temperature to 2,200 Kelvin (K) at dawn, 3,500K in the morning hours, 4,000K in the afternoon hours, 3,000K in the early evening hours, 2,500K at sunset, 2,100K after sundown, and/or 1,900K at night during a sleep mode. The color temperature changes may be performed by the LED drivers based on commands from the system controller 110, or messages from other devices within the load control system 100 (e.g., control-source devices). The load control system 100 may further comprise other types of lighting control devices, such as, for example, electronic dimming ballasts for driving fluorescent lamps.

The control-target devices within the load control system 100 may comprise one or more daylight control devices, e.g., adjacent motorized window treatments 150a, 150b. The motorized window treatments 150a, 150b each may comprise a roller tube 152a, 152b for controlling the amount of outside light entering the room 102 through a window 104. The motorized window treatments 150a, 150b may each comprise respective covering materials, such as window treatment fabrics 154a, 154b. The window treatment fabrics 154a, 154b may be hanging in front of the window 104 and windingly received around the respective roller tube 152a, 152b. The roller tubes 152a, 152b may both be rotatably supported by mounting brackets 151 located at both ends of the roller tubes 152a, 152b. The window treatment fabric 154b may be a blackout fabric that prevents outside light from entering the space 102. The blackout fabric may have a color and/or openness factor that prevents outside light from entering the space 102. The window treatment fabric 154a may be a warm sheer fabric that has an openness factor and/or color that allows a certain amount of outside light into the room. The window treatment may also, or alternatively, comprise a cool sheer fabric.

Warm sheer fabric may comprise a material having warm colors (e.g., or warm shades of a given color), and a cool sheer fabric may comprise a material having cool colors (e.g., or cool shades of a given color). Warm colors may have a relatively low color temperature (e.g., within a range of approximately 2600K to 3700K), while cool colors may have a relatively high color temperature (e.g., within a range of approximately 5000K to 8300K). The window treatment fabric may affect the color temperature of light within a space. For example, outside light shining through a warm sheer fabric may cause the color temperature in the space to decrease, and outside light shining through a cool sheer fabric may cause the color temperature of the space to increase.

The motorized window treatments 150a, 150b may further comprise a one or more motor drive units 156a, 156b located inside of the respective roller tubes 152a, 152b. The motor drive units 156a, 156b may be configured to rotate the respective roller tubes 152a, 152b for raising and lowering the window treatment fabrics 154a, 154b to control the amount of outside light (e.g., daylight) entering the room 102. The motor drive units 156a, 156b of the motorized window treatments 150a, 150b may be configured to receive messages via the RF signals 108 (e.g., from the system controller 110 or a control-source device) and adjust the position of the respective window treatment fabric 154a, 154b in response to the received messages. The load control system 100 may comprise other types of daylight control devices, such as, for example, a cellular shade, a drapery, a Roman shade, a Venetian blind, a Persian blind, a pleated blind, a tensioned roller shade systems, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference. One or more other example motorized window treatments may be used.

The motorized window treatments 150a, 150b may be controlled such that a hembar, or a bottom of the respective window treatment fabric 154a, 154b, is at a certain position (e.g., level) on the window 104. The motorized window treatments 150a, 150b may be controlled in response to messages from a control-source device (e.g., button press on remote control 170, sensor information, etc.). The motorized window treatments 150a, 150b may be automatically controlled to a certain position (e.g., by the system controller 110, a control-source device, or another device in the system) based on a shade control mode (e.g., scene) and/or user preference. An example of an automated control system for motorized window treatments is described in greater detail in U.S. Pat. No. 8,786,236, issued Jul. 22, 2014, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference. One or more other example automated control systems for motorized window treatments may be implemented. The shade control mode and/or user preferences may be implemented by control parameters for providing the control mode and/or user preferences. For example, the position of each of the window treatment fabrics 154a, 154b may be controlled to a certain position based on the time of day, date, location of the building, location of the room 102 in the building, location of the window 104, weather, season, shadows, location of the occupant 142 in the room, location of the occupant's mobile device 140 in the room, occupancy/vacancy of the room 102, a location of a workspace 106 in the room 102, a view setting for allowing occupants to have an outside view, a privacy setting for allowing occupants to have privacy from the outside view, a glare setting for preventing daylight glare for an occupant within the space, characteristics of the window treatment fabric 154a, 154b (e.g., openness factor for allowing light into space, color, etc.), and/or the current position of the window treatment fabric 154a, 154b on the window.

Though the load control system 100 shows multiple motorized window treatments 150a, 150b having respective window treatment fabrics 154a, 154b, more or less window treatments may be implemented. For example, the load control system 100 may comprise a single motorized window treatment having a window treatment fabric having multiple panels of different materials (e.g., a warm sheer fabric panel, a cool sheer fabric panel, a blackout fabric panel, etc.). An example of a load control system having a single motorized window treatment that may have multiple panels is described in U.S. Pat. No. 5,467,266, issued on Nov. 14, 1995, entitled MOTOR-OPERATED WINDOW COVER, the entire disclosures of which are hereby incorporated by reference. One or more other load control systems having a single motorized window treatment that may have multiple panels may be implemented. Electrochromic glass may be used to adjust the color temperature of outside light that is entering the space (e.g., in place of blackout and/or sheer fabric).

The load control system 100 may comprise one or more control-source devices, e.g., such as a remote control device 170, fixture color temperature sensors 160-166, a room color temperature sensor 180, or an outside color temperature sensor 182. The system controller 110 may be configured to transmit one or more messages to the control-target devices (e.g., the LED drivers in lighting fixtures 120-126 and/or the motorized window treatments 150a, 150b) in response to the messages received from the control-source devices. The control-source devices may also, or alternatively, communicate directly with the control-target devices via wired or wireless communications.

The remote control device 170 may be configured to transmit messages via the RF signals 108 to the system controller 110 (e.g., directly to the system controller) in response to an actuation of one or more buttons of the remote control device 170. The messages may include an identifier of a type of actuation performed on the device. The message may indicate or include a lighting color (e.g., chromaticity coordinates), correlated color temperature (CCT), a dimming intensity, a relative change in color, a relative change in color temperature, a relative change in dimming intensity, and/or a predefined scene. The remote control device 170 may be battery-powered. The remote control device 170 may be installed in a wall of the room 102 and/or may be a mobile device.

The room color temperature sensor 180 may be installed in the interior of the room 102 and may measure a color temperature $CCT_{INSIDE}$ inside of the space (e.g., within a viewable range in the room 102 below the room color temperature sensor). The viewable range may include a space that may be affected by the light emitted from the multiple lighting fixtures 120-126 and/or outside light shining through the window 104. The room color temperature sensor 180 may communicate (e.g., via wired or wireless communication) with the lighting control devices of the lighting fixtures 120-126, or other load control devices, via the system controller 110 (e.g., to create a closed-loop color control). The room color temperature sensor 180 may also, or alternatively, communicate directly (e.g., via wired or wireless communication) with the lighting control devices.

The outside color temperature sensor 182 may measure a color temperature $CCT_{OUT}$ of light outside of the room 102 (e.g., shining onto the window 104). The outside color temperature sensor 182 may be installed on the interior or exterior of the window 104, or on the exterior or the building, to measure the color temperature $CCT_{OUT}$ of the light outside the room 102. The outside color temperature sensor 182 may communicate (e.g., via wired or wireless communication) with the lighting control devices of the lighting fixtures 120-126, or other load control devices, via the system controller 110 (e.g., to create an open-loop color control). The outside color temperature sensor 182 may also, or alternatively, communicate directly (e.g., via wired or wireless communication) with the lighting control devices.

The fixture color temperature sensors 160-166 may be installed on respective lighting fixtures 120-126. The fixture color temperature sensors 160-166 may each measure a value of the inside color temperature $CCT_{INSIDE}$ inside of the room 102 (e.g., within a viewable range below the respective lighting fixtures 120-126) and may transmit messages that include the measured color temperature (e.g., a value or an image) in the space 102. The viewable range of each of the fixture color temperature sensors 160-166 may include a space that may be affected by the light emitted from multiple lighting fixtures 120-126 and/or outside light from the window 104. As the fixture color temperature sensors 160-166 are installed on the respective lighting fixtures 120-126, the values of the inside color temperature $CCT_{INSIDE}$ measured by each of the fixture color temperature sensors 160-166 may differ and may represent the inside color temperature $CCT_{INSIDE}$ in the viewable range. Each fixture color temperature sensor 160-166 may communicate directly (e.g., via wired or wireless communication) with the lighting control device of the respective lighting fixture 120-126 (e.g., to create a closed-loop color control). The fixture color temperature sensors 160-166 may also, or alternatively, communicate with the lighting control devices, or other load control devices, via the system controller 110.

The system controller 110 may be coupled to a network, such as a wireless or wired local area network (LAN), e.g., for access to the Internet. The system controller 110 may be wirelessly connected to the network, e.g., using Wi-Fi or cellular technology. The system controller 110 may be coupled to the network via a network communication bus (e.g., an Ethernet communication link). The system controller 110 may be configured to communicate via the network with one or more network devices, e.g., a mobile device 140, such as, a personal computing device and/or a wearable wireless device. The mobile device 140 may be located on an occupant 142. For example, the mobile device 140 may be attached to the occupant's body or clothing, or may be held by the occupant. The mobile device 140 may be characterized by a unique identifier (e.g., a serial number or address stored in memory) that uniquely identifies the mobile device 140 and thus the occupant 142. Examples of personal computing devices may include a smart phone (for example, an iPhone® smart phone, an Android® smart phone, or a Blackberry® smart phone), a laptop, and/or a tablet device (for example, an iPad® hand-held computing device). Examples of wearable wireless devices may include an activity tracking device (such as a FitBit® device, a Misfit® device, and/or a Sony Smartband® device), a smart watch, smart clothing (e.g., OMsignal® smartwear, etc.), and/or smart glasses (such as Google Glass® eyewear). In addition, the system controller 110 may be configured to communicate via the network with one or more other control systems (e.g., a building management system, a security system, etc.).

The mobile device 140 may be configured to transmit messages to the system controller 110, for example, in one or more Internet Protocol packets. For example, the mobile device 140 may be configured to transmit messages to the system controller 110 over the LAN and/or via the Internet. The mobile device 140 may be configured to transmit messages over the Internet to an external service (e.g., If This Then That (IFTTT®) service), and then the messages may be received by the system controller 110. The mobile device 140 may transmit and receive RF signals 109 via a Wi-Fi communication link, a Wi-MAX communications link, a Bluetooth communications link, a near field communication (NFC) link, a cellular communications link, a television white space (TVWS) communication link, or any combination thereof. Alternatively, or additionally, the mobile device 140 may be configured to transmit RF signals 109 according to another protocol. The load control system 100 may comprise other types of network devices coupled to the network, such as a desktop personal computer, a Wi-Fi or wireless-communication-capable television, or any other suitable Internet-Protocol-enabled device. Examples of load control systems operable to communicate with mobile and/or network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference. One or more other load control systems operable to communicate with mobile and/or network devices on a network may be implemented.

The operation of the load control system 100 may be programmed, configured, and/or controlled using, for example, the mobile device 140 or other network device (e.g., when the mobile device is a personal computing device). The mobile device 140 may execute a graphical user interface (GUI) configuration software for allowing a user to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., the lighting control devices and/or the motorized window treatments 150a, 150b) such as desired color temperatures for the lighting control devices. The load control database may comprise information regarding associations between control target devices and the control-source devices. The load control database may comprise information regarding how the control-target devices respond to messages received from the control-source devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No.

2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2018, entitled COMMISSIONING LOAD CONTROL SYSTEMS, the entire disclosures of which are hereby incorporated by reference. One or more other configuration procedures for load control systems on a network may be used.

The system controller 110 may be configured to automatically operate according to control parameters in a programmed control mode or indicated in user preferences (e.g., preprogrammed user preferences, commands from the remote control device 170, commands from the mobile device 140, etc.) to turn the lighting loads in the lighting fixtures 120-126 on and off, change the intensity level of the lighting loads in the lighting fixtures 120-126, change the color (e.g., color temperature) of the lighting loads in the lighting fixtures 120-126, and/or control the motorized window treatment. For example, the system controller 110 may be configured to change the color temperature of the lighting loads in lighting fixtures 120-126 over the course of a day, while also being configured to open the motorized window treatments 150a, 150b to allow for a view outside of the window 104 by the occupant 142 during certain times of day and/or close the window treatment fabric 154a, 154b to provide privacy to the occupant 142 or prevent glare during certain times of day. As the color temperature in the room 102 may be affected by the color temperature of the outside light entering the space through the window 102, the position and/or the characteristics of the window treatment fabric 154a, 154b (e.g., openness factor for allowing light into space, color, etc.) may be considered with the color temperature of the light emitted by the lighting fixtures 120-126 to achieve the desired color temperature within the room 102, or portions thereof. As some control modes or user preferences may prioritize moving the position of shades, while others may prioritize changing the color temperature of the lighting loads in lighting fixtures, the system may be controlled according to the given preference, but may be overridden to achieve a setpoint color temperature (e.g., a desired color temperature).

Figure 2:
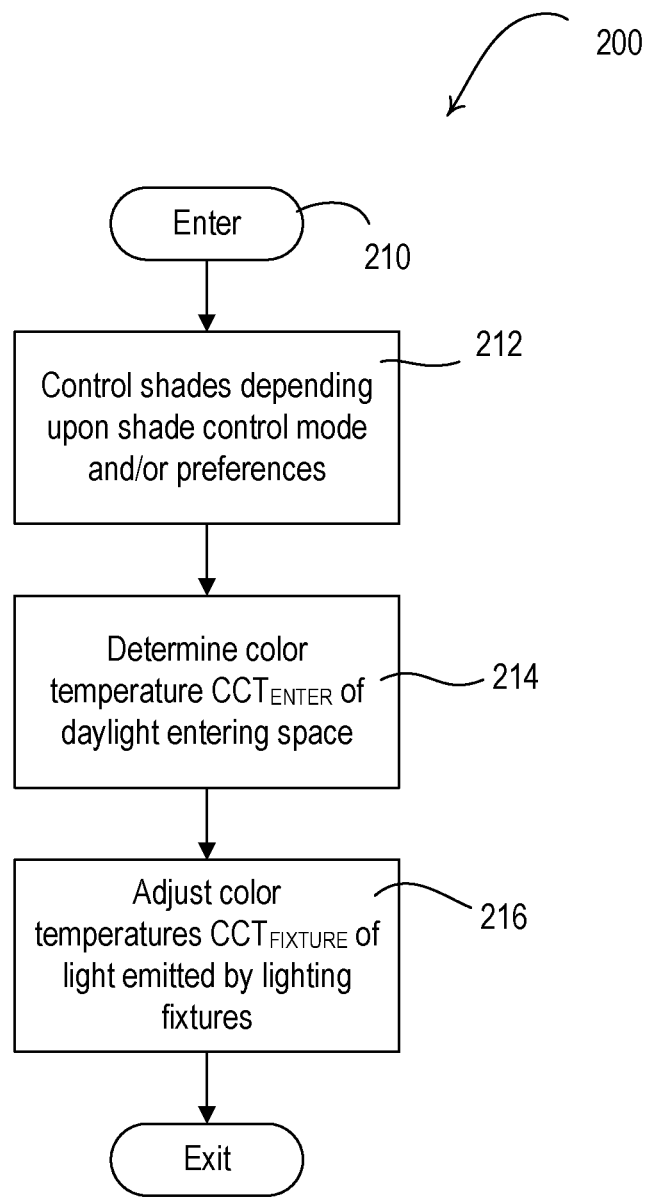
FIG. 2 is a flowchart of an example process for controlling a color temperature of light in a space.

FIG. 2 is a flowchart of an example process 200 for controlling a color temperature of light in a space. The process 200 may be performed at a single device, or distributed across multiple devices. For example, the process 200 may be performed at a system controller, a mobile user device, a sensor, a load control device, and/or another computing device. Though the process 200 may be described with reference to a certain device, such as the system controller, one or more other devices in the load control system may be implemented to perform similar functionality.

Figure 3:
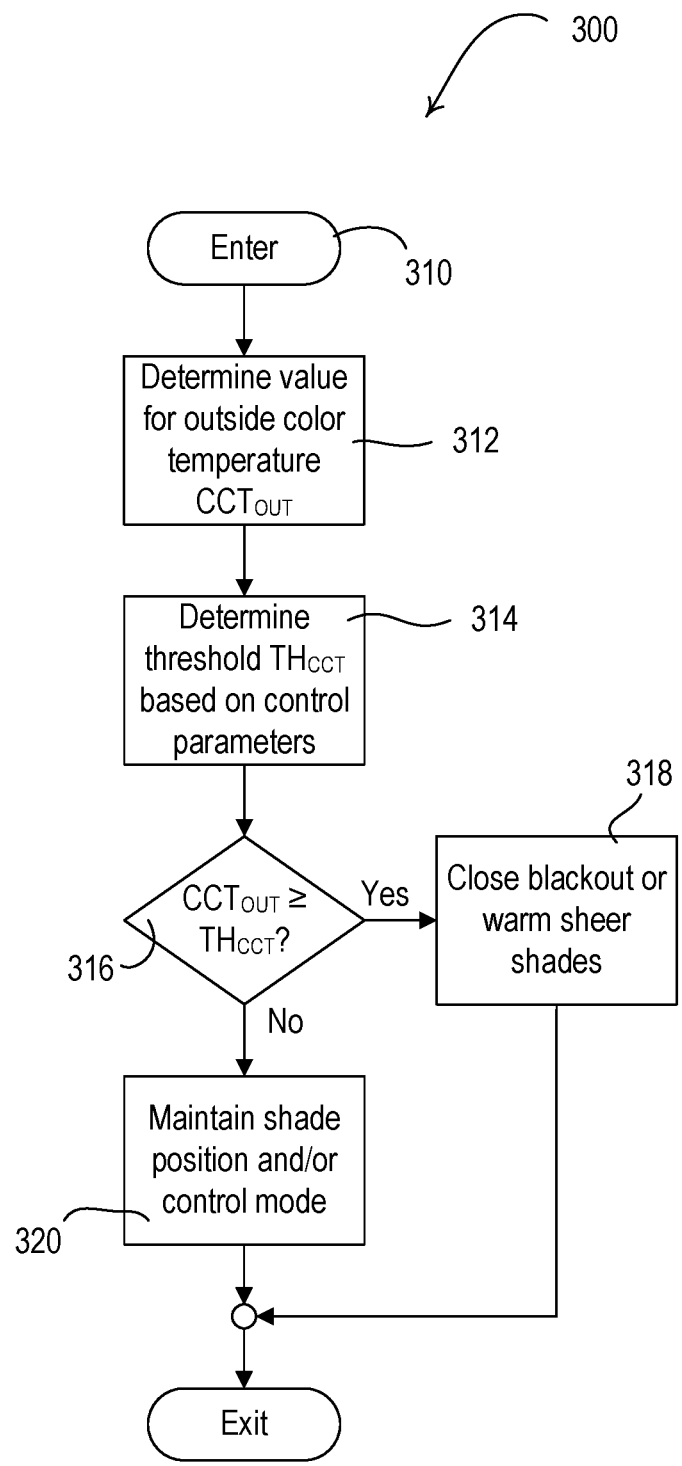
FIG. 3 is a flowchart of an example process for controlling a motorized window treatment when the color temperature representing the outside light is above a color temperature threshold.
Figure 4:
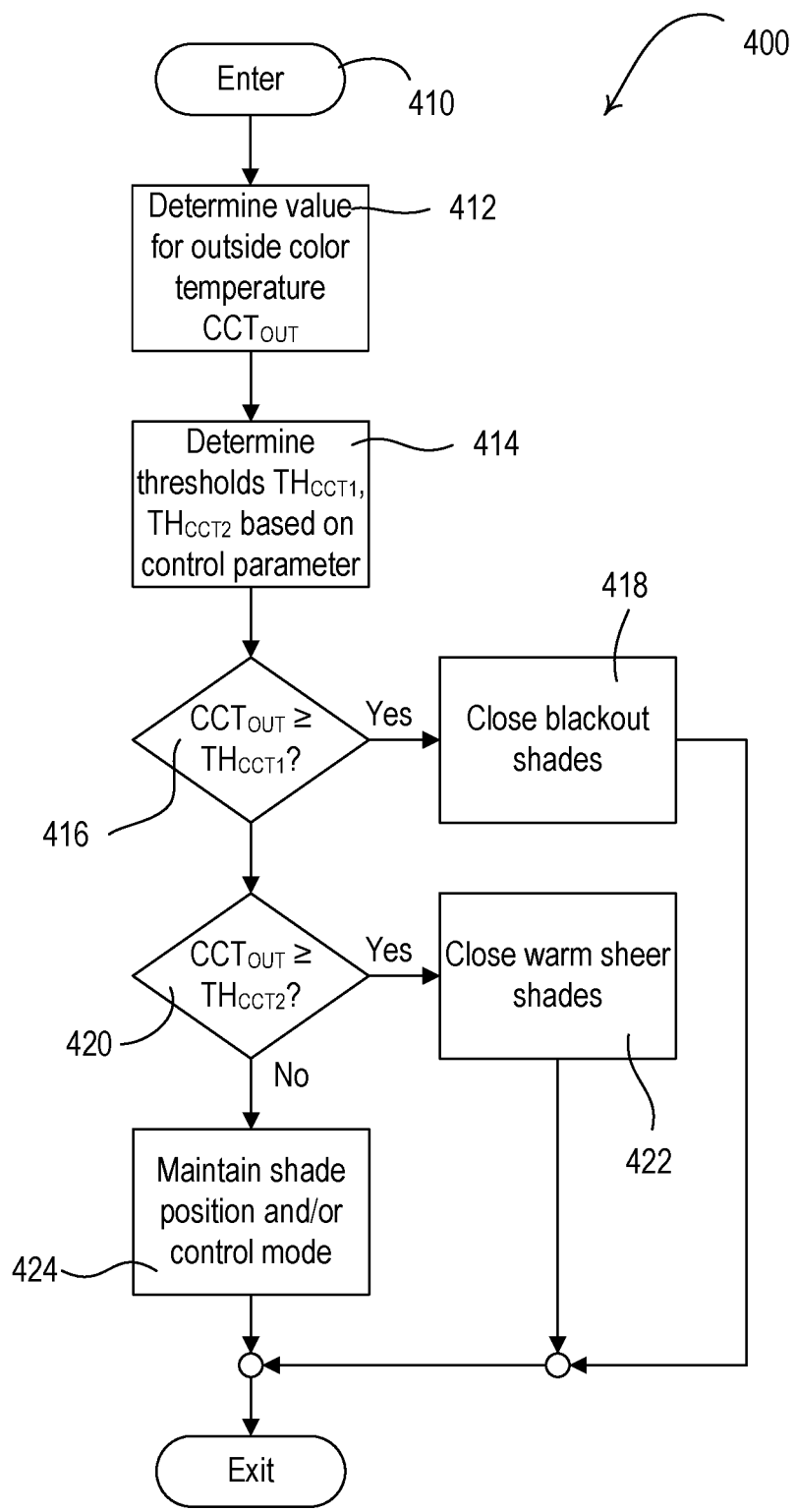
FIG. 4 is a flowchart of an example process for controlling a motorized window treatment when the color temperature of the outside light is above one or more color temperature thresholds.
Figure 5:
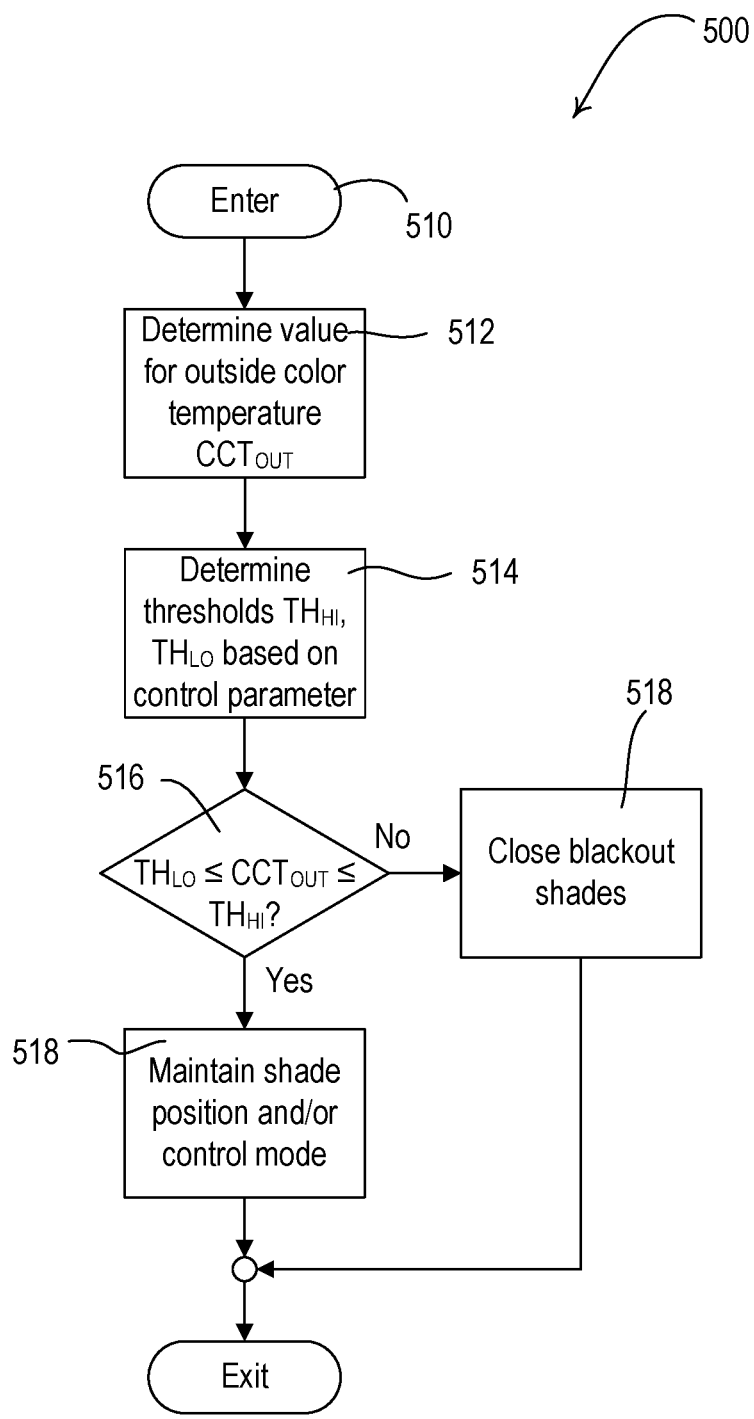
FIG. 5 is a flowchart of an example process for controlling a motorized window treatment when the color temperature representing the outside light is between color temperature thresholds.

As shown in FIG. 2, the process 200 may begin at 210. At 212, the covering material of a motorized window treatment may be controlled depending upon a control mode and/or user preference. The covering material may be shades, for example. While the term shades may be used herein, other window treatments may similarly be controlled, such as draperies, Venetian blinds, etc. The shade control mode and/or user preferences may be implemented by control parameters for providing the control mode and/or user preferences. For example, the window treatment fabric may be controlled to a certain position based on the time of day, date, location of the building, location of the room in the building, location of the window, weather, season, shadows, location of the occupant, location of the occupant's mobile device, occupancy/vacancy of the room, a location of a workspace in the room, a view setting for allowing occupants to have an outside view, a privacy setting for allowing occupants to have privacy from the outside view, a glare setting for preventing daylight glare for an occupant within the space, characteristics of the window treatment fabric (e.g., openness factor for allowing light into space, color, etc.), and/or the position of the window treatment fabric on the window. The shades may be opened and closed according to the control parameters of the control mode or the user preferences to allow for outside light to enter the space or allow the occupant to have an outside view. The control parameters of the shades may be overridden when the color temperature $CCT_{OUT}$ of the outside light is in an undesired color temperature range (e.g., as illustrated in FIGS. 3-5). The color temperature $CCT_{OUT}$ of the outside light may be measured by a color temperature sensor (e.g., the outside color temperature sensor 182).

Figure 6:
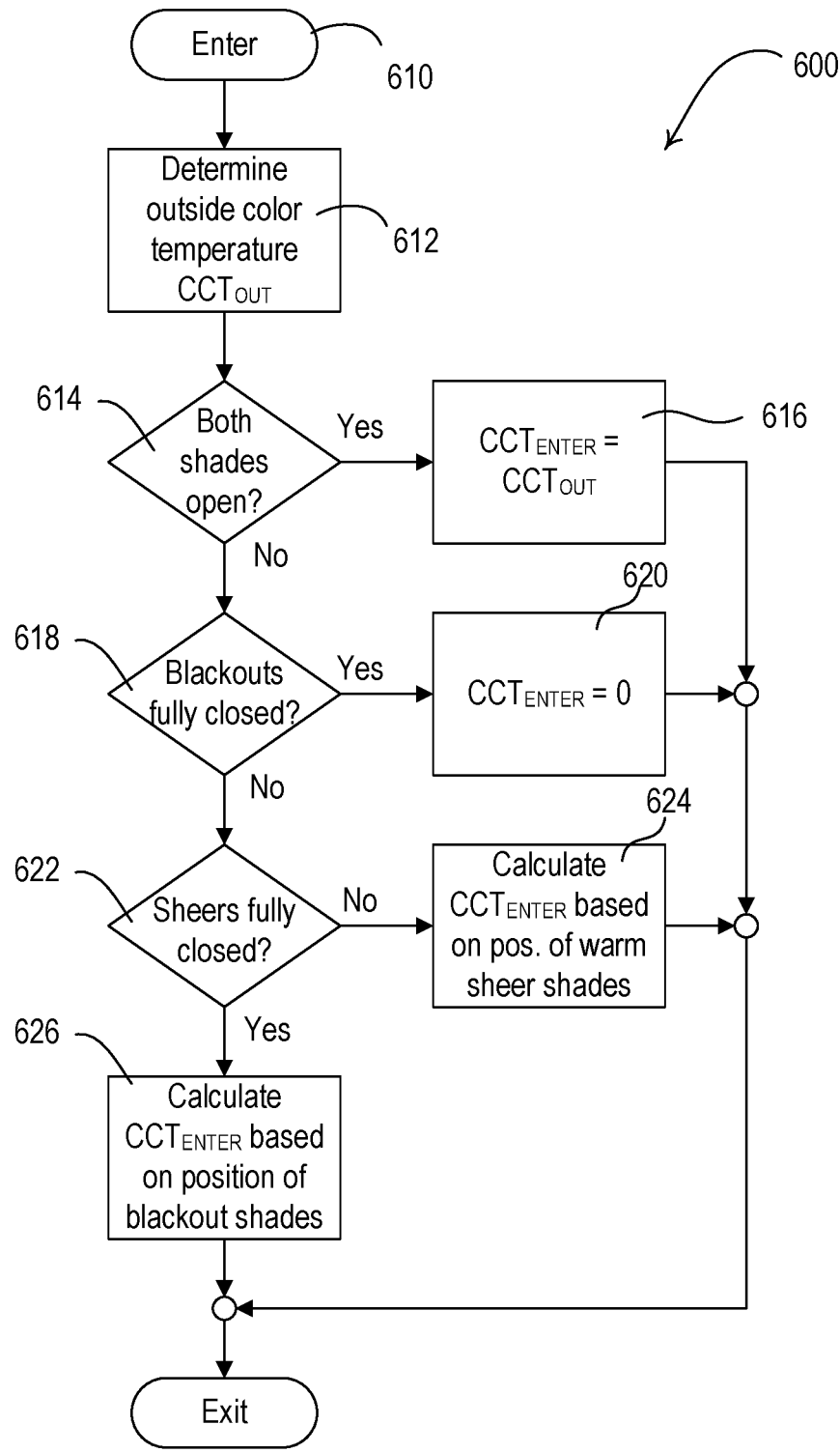
FIG. 6 is a flowchart of an example process for determining the value of the color temperature of the outside light that may be entering a space.

After controlling the shades, a color temperature $CCT_{ENTER}$ of the light entering the space may be determined at 214. The color temperature $CCT_{ENTER}$ of the light entering the space may used to control color temperatures $CCT_{FIXTURE}$ of the light emitted by one or more lighting control devices in respective lighting fixtures. The color temperature $CCT_{ENTER}$ of the light entering the space may be determined based on the color temperature $CCT_{OUT}$ of the outside light, the position of the window treatment fabric of one or more motorized window treatments and/or the fabric characteristics of the shade fabric (e.g., as illustrated in FIG. 6). The color temperature $CCT_{ENTER}$ of the light entering the space $CCT_{ENTER}$ may also, or alternatively, be determined by taking measurements from an interior color temperature sensor (e.g., the fixture color temperature sensors 120-126 or the room color temperature sensor 180 shown in FIG. 1). The interior color temperature $CCT_{INSIDE}$ may be measured in a space near the windows when the lighting fixtures 120-122 are on (e.g., to get a measurement of the combined color temperature of the color temperature $CCT_{ENTER}$ of the light entering the space and the color temperature $CCT_{FIXTURE}$ of the light emitted by one or more lighting fixtures) or off (e.g., to get a measurement of the color temperature of the color temperature $CCT_{ENTER}$ of the light entering the space).

Figure 7:
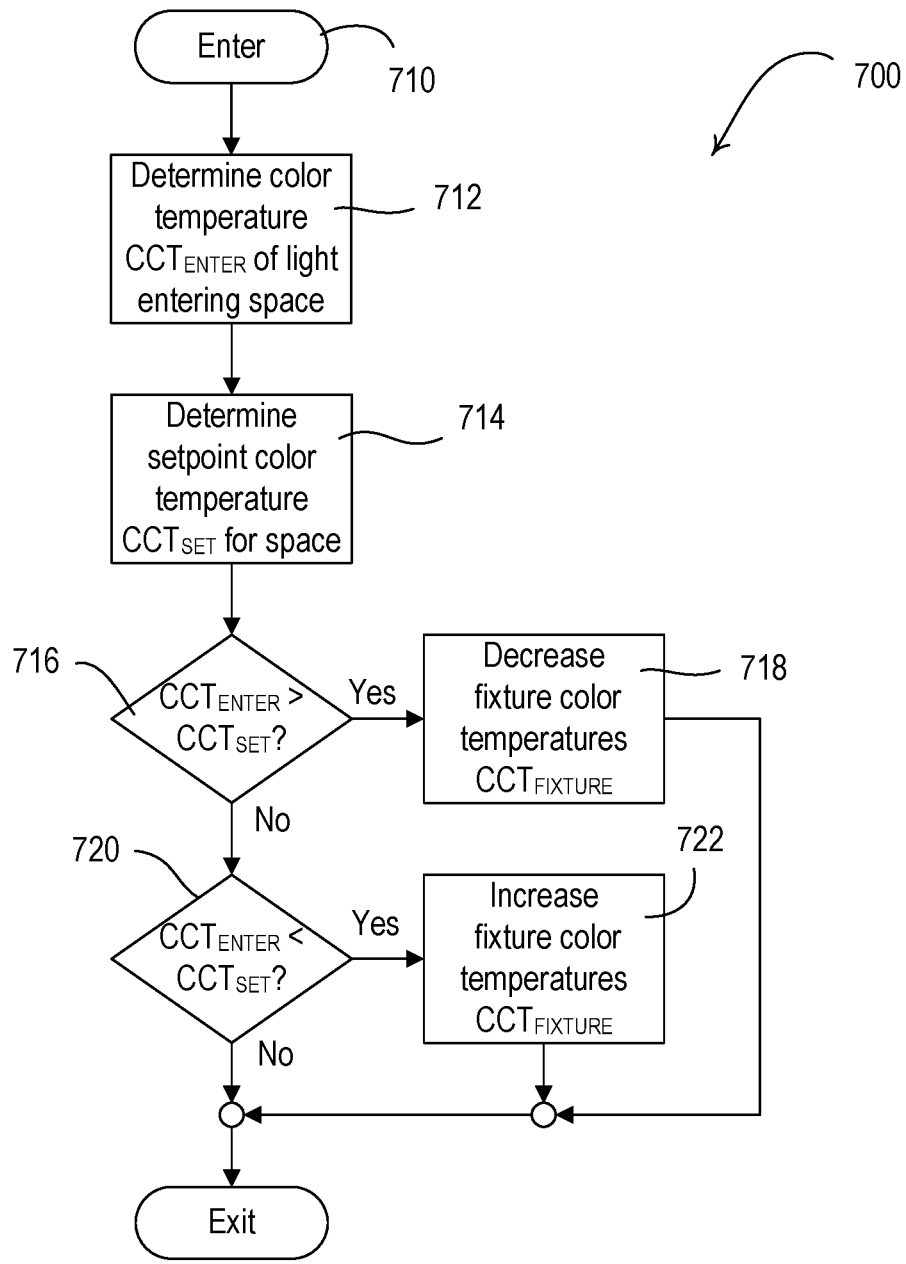
FIG. 7 is a flowchart of an example process for controlling a color temperature value of a lighting fixture when the color temperature of the outside light entering the space is above a setpoint color temperature.

At 216, the color temperature $CCT_{FIXTURE}$ to which each of the lighting control devices may control the light emitted by respective lighting fixtures may be adjusted (e.g., as shown in FIG. 7). The color temperature $CCT_{FIXTURE}$ to which a lighting control device may control the light emitted by a respective lighting fixture may depend on the location of the lighting fixture in the space, the color temperature $CCT_{ENTER}$ of the light entering the space, the interior color temperature $CCT_{INSIDE}$ of the space, and/or the vibrancy. The shade position may be dynamically controlled with the color temperature of the light emitted by the lighting fixtures $CCT_{FIXTURE}$ to achieve a target color temperature based on the color temperature $CCT_{ENTER}$ of the light entering the space.

FIGS. 3-5 illustrate examples of performing shade control when the color temperature $CCT_{OUT}$ of the outside light is above or below a threshold. FIG. 3 is a flowchart of an example process 300 for controlling a motorized window treatment when the color temperature $CCT_{OUT}$ representing the outside light is above a color temperature threshold $TH_{CCT}$. The color temperature threshold $TH_{CCT}$ may be different for different control modes or user preferences. The process 300 may be performed at a single device, or distributed across multiple devices. For example, the process 300 may be performed at a system controller, a mobile user device, a sensor, a load control device, and/or another computing device. Though the process 300 may be described with reference to a certain device, such as the system controller, one or more other devices in the load control system may be implemented to perform similar functionality.

As shown in FIG. 3, the process 300 may begin at 310. At 312, a value may be determined that represents the color temperature $CCT_{OUT}$ of the outside light. For example, the value for the color temperature $CCT_{OUT}$ of the outside light may be determined by measuring the color temperature using a color temperature sensor (e.g., the outside color temperature sensor 182). The color temperature sensor may be installed on a window or another location that enables the color temperature $CCT_{OUT}$ of the outside light to be measured. The measurements may be provided to a system controller, a load control device, and/or another device in the system.

At 314, a color temperature threshold $TH_{CCT}$ may be determined. The color temperature threshold $TH_{CCT}$ may be determined based on the control parameters for a given control mode or user preferences (e.g., the current control parameters under which the motorized window treatment is being controlled). For example, the color temperature threshold $TH_{CCT}$ may be dependent upon a desired color temperature (e.g., a setpoint color temperature $CCT_{SET}$) within the space. The control mode and/or user preferences may be implemented by control parameters, such as the time of day, date, location of the building, location of the room in the building, location of the window, weather, season, shadows, location of the occupant, location of the occupant's mobile device, occupancy/vacancy of the room, a location of a workspace in the room, a view setting for allowing occupants to have an outside view, a privacy setting for allowing occupants to have privacy from the outside view, and/or a glare setting for preventing daylight glare for an occupant within the space. Different values for the color temperature threshold $TH_{CCT}$ may be determined based on different control parameters for different control modes and/or user preferences. The color temperature threshold $TH_{CCT}$ may change throughout a day, week, month, season, etc. For example, the color temperature threshold $TH_{CCT}$ may be lower in the morning when the desired color temperature is lower (e.g., 2,200K) than later in the day when the desired color temperature of the space is higher (e.g., 4,000K). The color temperature threshold $TH_{CCT}$ may be higher (e.g., 4,000K) when the system is operating in a productivity mode and color temperature threshold $TH_{CCT}$ may be lower (e.g., 2,000K) when the system is operating in a relaxation mode.

If, at 316, a determination is made that the value representing the color temperature $CCT_{OUT}$ of the outside light is greater than, or equal to, the color temperature threshold $TH_{CCT}$, the shade position may be controlled at 318. The shade position may be controlled at 318 to limit the effect of the color temperature $CCT_{OUT}$ of the outside light on the interior color temperature $CCT_{INSIDE}$. For example, a motorized window treatment having a warm sheer fabric (e.g., the motorized window treatment 150a) and/or a motorized window treatment having a blackout fabric (e.g., the motorized window treatments 150b) may be closed to limit the effect of the color temperature of the outside light $CCT_{OUT}$ on the interior color temperature $CCT_{INSIDE}$. The motorized window treatment having blackout fabric may be fully closed to prevent the color temperature $CCT_{OUT}$ of the outside light from affecting the interior color temperature $CCT_{INSIDE}$. The motorized window treatment having warm sheer fabric may be fully closed to limit the effect of the color temperature $CCT_{OUT}$ of the outside light on the interior color temperature $CCT_{INSIDE}$ and/or to shift the color temperature $CCT_{ENTER}$ of the light entering the space due to the openness factor and/or color of the warm sheer fabric (e.g., to decrease the color temperature in the space). The motorized window treatment having blackout fabric and/or the motorized window treatment having warm sheer fabric may be closed a predefined amount or continuously and a determination may be made based on measurements by an interior color temperature sensor that triggers the shades to stop closing because the setpoint color temperature $CCT_{SET}$ (e.g., the desired interior color temperature $CCT_{INSIDE}$) has been achieved. If, at 316, a determination is made that the value representing the color temperature $CCT_{OUT}$ of the outside light is less than the color temperature threshold $TH_{CCT}$, the shade position and/or the control mode may be maintained at 320.

A similar procedure to the procedure 300 may be performed for controlling a motorized window treatment having a blackout fabric and/or a motorized window treatment having a cool sheer fabric. In such a procedure, a determination may be made as to whether the outside color temperature $CCT_{OUT}$ of the outside light is less than or equal to the color temperature threshold $TH_{CCT}$. If the outside color temperature $CCT_{OUT}$ of the outside light is less than or equal to the color temperature threshold $TH_{CCT}$, the motorized window treatment having blackout fabric and/or the motorized window treatment having cool sheer fabric may be controlled. For example, the motorized window treatment having blackout fabric and/or the motorized window treatment having cool sheer fabric may be closed a predetermined amount or fully closed (e.g., to increase the color temperature in the space). If the outside color temperature $CCT_{OUT}$ of the outside light greater than the color temperature threshold $TH_{CCT}$, the position of the motorized window treatment having blackout fabric and/or the motorized window treatment having cool sheer fabric may be maintained.

FIG. 4 is a flowchart of an example process 400 for controlling a motorized window treatment when the color temperature $CCT_{OUT}$ of the outside light is above or below one or more color temperature thresholds $TH_{CCT1}$, $TH_{CCT2}$. For example, a different color temperature threshold may be assigned to different types of shade fabrics (e.g., blackout fabrics, warm sheer fabrics, cool sheer fabrics, etc.) to enable the motorized window treatments to be controlled based on the characteristics of the shade fabric (e.g., openness factor, color, etc.). The color temperature thresholds $TH_{CCT1}$, $TH_{CCT2}$ may be different for different control modes or user preferences. The process 400 may be performed at a single device, or distributed across multiple devices. For example, the process 400 may be performed at a system controller, a mobile user device, a sensor, a load control device, and/or another computing device. Though the process 400 may be described with reference to a certain device, such as the system controller, one or more other devices in the load control system may be implemented to perform similar functionality.

As shown in FIG. 4, the process 400 may begin at 410. At 412, a value may be determined that represents the color temperature $CCT_{OUT}$ of the outside light. For example, the value for the color temperature $CCT_{OUT}$ of the outside light may be determined by measuring the color temperature using a color temperature sensor (e.g., the outside color temperature sensor 182). The color temperature sensor may be installed on a window or another location that enables the color temperature $CCT_{OUT}$ of the outside light to be measured. The measurements may be provided to a system controller, a load control device, and/or another device in the system.

At 414, the color temperature thresholds $TH_{CCT1}$, $TH_{CCT2}$ may be determined. The first color temperature threshold $TH_{CCT1}$ may be a color temperature threshold value at which a corresponding window treatment fabric, such as the blackout fabric, may be controlled. The second color temperature threshold $TH_{CCT2}$ may be a color temperature threshold value at which another corresponding window treatment fabric, such as the warm sheer fabric, may be controlled. The first color temperature threshold $TH_{CCT1}$ may be a higher relative color temperature threshold value than the second color temperature threshold $TH_{CCT2}$, as the control of motorized window treatments having blackout fabric may create a greater difference in the effect of the outside color temperature $CCT_{OUT}$ on the interior space than the control of motorized window treatments having warm sheer fabric.

The color temperature thresholds $TH_{CCT1}$, $TH_{CCT2}$ may be determined based on the control parameters for a given control mode or user preferences. For example, the color temperature thresholds $TH_{CCT1}$, $TH_{CCT2}$ may be dependent upon a desired color temperature (e.g., a setpoint color temperature $CCT_{SET}$) within the space. The color temperature thresholds $TH_{CCT1}$, $TH_{CCT2}$ may change throughout a day, week, month, season, etc. The control mode and/or user preferences may be implemented by control parameters, such as the time of day, date, location of the building, location of the room in the building, location of the window, weather, season, shadows, location of the occupant, location of the occupant's mobile device, occupancy/vacancy of the room, a location of a workspace in the room, a view setting for allowing occupants to have an outside view, a privacy setting for allowing occupants to have privacy from the outside view, and/or a glare setting for preventing daylight glare for an occupant within the space. Different values for the color temperature thresholds $TH_{CCT1}$, $TH_{CCT2}$ may be determined based on different control parameters for different control modes and/or user preferences.

If, at 416, a determination is made that the value representing the color temperature $CCT_{OUT}$ of the outside light is greater than, or equal to, the first color temperature threshold $TH_{CCT1}$, the shade positions of the motorized window treatments having blackout fabric may be controlled at 418. The shade positions may be controlled at 418 to limit the effect of the color temperature $CCT_{OUT}$ of the outside light on the interior color temperature $CCT_{INSIDE}$. For example, the shade positions of the motorized window treatments having blackout fabric may be closed to limit effect of the color temperature $CCT_{OUT}$ of the outside light on the interior color temperature $CCT_{INSIDE}$. The motorized window treatments having blackout fabric may be closed a predefined amount or fully closed to limit or remove the effect of the color temperature $CCT_{OUT}$ of the outsight light on the color temperature of the light in the space. The motorized window treatments having blackout fabric may be fully closed to prevent the color temperature $CCT_{OUT}$ of the outside light from affecting the interior color temperature $CCT_{INSIDE}$. The motorized window treatments having blackout fabric may be closed a predefined amount or continuously and a determination may be made based on measurements by an interior color temperature sensor that triggers the shades to stop closing because the setpoint color temperature $CCT_{SET}$ has been achieved.

If, at 416, a determination is made that the value representing the color temperature $CCT_{OUT}$ of the outside light is less than the first color temperature threshold $TH_{CCT1}$, the shade position and/or the control mode may be maintained for the motorized window treatments having blackout fabric. If, at 420, a determination is made that the value representing the color temperature $CCT_{OUT}$ of the outside light is greater than, or equal to, the second color temperature threshold $TH_{CCT2}$, the shade position of the motorized window treatments having warm sheer fabric may be controlled at 422. For example, the motorized window treatments having warm sheer fabric may be closed a predefined amount or fully closed to limit the effect of the color temperature $CCT_{OUT}$ of the outsight light on the interior color temperature $CCT_{INSIDE}$ of the space (e.g., to decrease the color temperature in the space). The warm sheer fabric may have an openness factor that allows a certain predefined amount of outside light into the space and may bring the color temperature value of the space below the second color temperature threshold $TH_{CCT2}$. The motorized window treatments having warm sheer fabric may be closed a predefined amount or continuously and a determination may be made based on measurements by an interior color temperature sensor that triggers the shades to stop closing because the setpoint color temperature $CCT_{SET}$ has been achieved. If, at 420, a determination is made that the value representing the color temperature $CCT_{OUT}$ of the outside light is less than the second color temperature threshold $TH_{CCT2}$, the shade position and/or the control mode may be maintained for the motorized window treatments having warm sheer fabric and the motorized window treatments having blackout fabric.

FIG. 5 is a flowchart of an example process 500 for controlling a motorized window treatment when the color temperature $CCT_{OUT}$ representing the outside light is between color temperature thresholds $TH_{LO}$, $TH_{HI}$. The color temperature thresholds $TH_{LO}$, $TH_{HI}$ may be different for different control modes or user preferences. The process 500 may be performed at a single device, or distributed across multiple devices. For example, the process 500 may be performed at a system controller, a mobile user device, a sensor, a load control device, and/or another computing device. Though the process 500 may be described with reference to a certain device, such as the system controller, one or more other devices in the load control system may be implemented to perform similar functionality.

As shown in FIG. 5, the process 500 may begin at 510. At 512, a value may be determined that represents the color temperature $CCT_{OUT}$ of the outside light. For example, the value for the color temperature $CCT_{OUT}$ of the outside light may be determined by measuring the color temperature using a color temperature sensor (e.g., the outside color temperature sensor 182). The color temperature sensor may be installed on a window or another location that enables the color temperature $CCT_{OUT}$ of the outside light to be measured. The measurements may be provided to a system controller, a load control device, and/or another device in the system.

At 514, low and high color temperature thresholds $TH_{LO}$, $TH_{HI}$ may be determined. The low color temperature threshold $TH_{LO}$ may correspond to a desired warm-white color temperature threshold value for controlling a window treatment fabric. The high color temperature threshold $TH_{HI}$ may correspond to a desired cool-white color temperature threshold value for controlling a window treatment fabric, such as motorized window treatments having blackout fabric, for example. The low and high color temperature thresholds $TH_{LO}$, $TH_{HI}$ may change throughout a day, week, month, season, etc. The low and high color temperature thresholds $TH_{LO}$, $TH_{HI}$ may be determined based on the control parameters for a given control mode or user preferences. For example, the low and high color temperature thresholds $TH_{LO}$, $TH_{HI}$ may be dependent on a desired color temperature (e.g., a setpoint color temperature $CCT_{SET}$) within the space. The control mode and/or user preferences may be implemented by control parameters, such as the time of day, date, location of the building, location of the room in the building, location of the window, weather, season, shadows, location of the occupant, location of the occupant's mobile device, occupancy/vacancy of the room, a location of a workspace in the room, a view setting for allowing occupants to have an outside view, a privacy setting for allowing occupants to have privacy from the outside view, and/or a glare setting for preventing daylight glare for an occupant within the space. Different values for the low and high color temperature thresholds $TH_{LO}$, $TH_{HI}$ may be determined based on different control parameters for different control modes and/or user preferences.

If, at 516, a determination is made that the value representing the color temperature $CCT_{OUT}$ of the outside light is outside of the range (e.g., above or below the range) between the low color temperature threshold $TH_{LO}$ and the high color temperature threshold $TH_{HI}$, the shade positions of the motorized window treatments having blackout fabric may be controlled at 518. The shade positions may be controlled at 518 to limit the effect of the color temperature $CCT_{OUT}$ of the outside light on the interior color temperature $CCT_{INSIDE}$. For example, the motorized window treatments having blackout fabric may be closed to limit effect of the color temperature $CCT_{OUT}$ of the outside light on the interior color temperature $CCT_{INSIDE}$. The motorized window treatments having blackout fabric may be closed a predefined amount or fully closed to limit or remove the effect of the color temperature $CCT_{OUT}$ of the outsight light on the color temperature of the light in the space. The motorized window treatments having blackout fabric may be fully closed to prevent the color temperature $CCT_{OUT}$ of the outside light from affecting the interior color temperature $CCT_{INSIDE}$. The motorized window treatments having blackout fabric may be closed a predefined amount or continuously and a determination may be made based on measurements by an interior color temperature sensor that triggers the shades to stop closing because the setpoint color temperature $CCT_{SET}$ has been achieved. If, at 516, a determination is made that the value representing the color temperature $CCT_{OUT}$ of the outside light is within the low-end color temperature threshold $TH_{LO}$ and the high-end color temperature threshold $TH_{HI}$, the shade position and/or the control mode may be maintained.

FIG. 6 is a flowchart of an example process 600 for determining the value of the color temperature $CCT_{ENTER}$ of the outside light that may be entering a space. The color temperature $CCT_{ENTER}$ of the outside light that may be entering the space may depend on the position of the window treatment fabric of the motorized window treatment and/or the characteristics of the window treatment fabric. For example, the color temperature $CCT_{ENTER}$ of the outside light that may be entering the space may depend on the positions and/or characteristics of the multiple window treatment fabrics that may be hanging in front of the window (e.g., a blackout fabric and/or a warm sheer fabric). The process 600 may be performed at a single device, or distributed across multiple devices. For example, the process 600 may be performed at a system controller, a mobile user device, a sensor, a load control device, and/or another computing device. Though the process 600 may be described with reference to a certain device, such as the system controller, one or more other devices in the load control system may be implemented to perform similar functionality.

As shown in FIG. 6, the process 600 may begin at 610. At 612, the color temperature $CCT_{OUT}$ of the outside light may be determined. For example, the value for the color temperature $CCT_{OUT}$ of the outside light may be determined by measuring the color temperature using a color temperature sensor (e.g., the outside color temperature sensor 182). The color temperature sensor may be installed on a window or another location that enables the color temperature $CCT_{OUT}$ of the outside light to be measured. The measurements may be provided to a system controller, a load control device, and/or another device in the system.

A value representing the color temperature $CCT_{ENTER}$ of the light that may be entering the space may take into account a position and/or other characteristics (e.g., openness factor, color, etc.) of one or more window treatment fabrics (e.g., to estimate the effect of the color temperature $CCT_{OUT}$ of the outside light on the color temperature $CCT_{ENTER}$ of the light that may be entering the space). As shown at 614, a determination may be made as to whether each of the shades is fully open (e.g., each of the multiple window treatment fabrics that may be hanging in front of the window).

If, at 614, each shade is determined to be open, the value representing the color temperature $CCT_{ENTER}$ of the light that may be entering the space (e.g., and affecting the inside color temperature $CCT_{INSIDE}$ of the space) may be set equal to the outside color temperature $CCT_{OUT}$ at 616. If at least one shade is closed (e.g., fully or partially closed), the color temperature value representing the outside color temperature $CCT_{OUT}$ that may be entering the space $CCT_{ENTER}$ may be set based on the position of the window treatment fabric and/or the other characteristics (e.g., openness factor, color, etc.) of the window treatment fabric. For example, if a motorized window treatment having blackout fabric is determined to be fully closed at 618, the value representing the color temperature $CCT_{ENTER}$ of the light that may be entering the space may be set equal to zero (e.g., as a blackout fabric that is fully closed may prevent the color temperature $CCT_{OUT}$ of the outside light from affecting the color temperature $CCT_{INSIDE}$ of the interior light of the space).

If the motorized window treatment having blackout fabric is open (e.g., fully or partially open), or is not used, a determination may be made at 622 as to whether a motorized window treatment having sheer fabric is fully closed. If the motorized window treatment having warm sheer fabric is open (e.g., fully or partially open), the value representing the color temperature $CCT_{ENTER}$ of the light that may be entering the space may be calculated based on the position of the motorized window treatment having warm sheer fabric and/or the properties of the warm sheer fabric at 624. If the motorized window treatment having warm sheer fabric is determined to be fully closed at 622, the value representing the color temperature $CCT_{ENTER}$ of the light that may be entering the space may be calculated based on the position of the motorized window treatment having blackout fabric and/or the properties of the blackout fabric at 626. Other parameters, such as the weather or time of day may also be considered.

FIG. 7 is a flowchart of an example process 700 for controlling a color temperature value of a lighting fixture $CCT_{FIXTURE}$ when a determined color temperature $CCT_{ENTER}$ of the outside light entering a space is above a desired color temperature (e.g., setpoint color temperature value $CCT_{SET}$). The process 700 may be performed at a single device, or distributed across multiple devices. For example, the process 700 may be performed at a system controller, a mobile user device, a sensor, a load control device, and/or another computing device. Though the process 700 may be described with reference to a certain device, such as the system controller, one or more other devices in the load control system may be implemented to perform similar functionality.

As shown in FIG. 7, the process 700 may begin at 710. For example, the process 700 may be executed periodically. At 712, a color temperature $CCT_{ENTER}$ of the outside light that is entering the space may be determined. For example, the value for the color temperature $CCT_{ENTER}$ of the outside light that is entering the space may be determined by measuring the color temperature $CCT_{OUT}$ of the outside light using a color temperature sensor (e.g., the outside color temperature sensor 182). The color temperature sensor may be installed on a window or another location that enables the color temperature of the outside light $CCT_{OUT}$ to be measured. Other parameters may be considered in determining the value for the color temperature $CCT_{ENTER}$ of the light entering the space. For example, the shade position of the window treatment fabrics may be considered, and/or the characteristics of the window treatment fabrics (e.g., openness factor, color etc.) Other parameters, such as the weather or time of day may also be considered. An example process for determining the value representing the color temperature $CCT_{ENTER}$ of the outside light that is entering the space is shown in FIG. 6. An interior color temperature sensor may also, or alternatively, be used, as described herein, to determine the color temperature $CCT_{ENTER}$ of the outside light that is entering the space. The measurements may be provided to a system controller, a load control device, and/or another device in the system.

At 714, a setpoint color temperature $CCT_{SET}$ (e.g., a desired color temperature) may be determined for the space. Each of the lighting control devices in the space may adjust the color temperature $CCT_{FIXTURE}$ of the light emitted by the respective lighting fixtures to attempt to control the color temperature $CCT_{INSIDE}$ of the light inside the space towards the setpoint color temperature $CCT_{SET}$. If, at 716, it is determined that the color temperature $CCT_{ENTER}$ of the outside light that is entering the space is greater than the setpoint color temperature $CCT_{SET}$, the color temperature value $CCT_{FIXTURE}$ to which each of the lighting control devices in the respective lighting fixtures is being controlled may be decreased at 718. The color temperature value $CCT_{FIXTURE}$ of the lighting control devices in the respective lighting fixtures (e.g., all of the lighting fixtures) may be decreased by a predefined amount or by at least the amount that the color temperature $CCT_{ENTER}$ of the outside light that is entering the space is over the setpoint color temperature $CCT_{SET}$. When the process 700 is executed periodically, the color temperature value $CCT_{FIXTURE}$ of the lighting control devices in the respective lighting fixtures may be decreased (e.g., each time that the process 700 is executed) until the determined color temperature $CCT_{ENTER}$ of the outside light that is entering the space is less than or equal to the setpoint color temperature $CCT_{SET}$.

If, at 720, it is determined that the color temperature $CCT_{ENTER}$ of the outside light that is entering the space is less than the setpoint color temperature $CCT_{SET}$, the color temperature value $CCT_{FIXTURE}$ to which each of the lighting control devices in the respective lighting fixtures is being controlled may be increased at 722. The color temperature value $CCT_{FIXTURE}$ of the lighting control devices in the respective lighting fixtures (e.g., all of the lighting fixtures) may be increased by a predefined amount or by at least the amount that the color temperature $CCT_{ENTER}$ of the outside light that is entering the space is below the setpoint color temperature $CCT_{SET}$. When the process 700 is executed periodically, the color temperature value $CCT_{FIXTURE}$ of the lighting control devices in the respective lighting fixtures $CCT_{FIXTURE}$ may be increased (e.g., each time that the process 700 is executed) until the determined color temperature $CCT_{ENTER}$ of the outside light that is entering the space is greater than or equal to the setpoint color temperature. If the determined that the color temperature $CCT_{ENTER}$ of the outside light that is entering the space is not greater than the setpoint color temperature $CCT_{SET}$ at 716, and not less than the setpoint color temperature $CCT_{SET}$ at 720 (e.g., the color temperature $CCT_{ENTER}$ of the outside light that is entering the space is equal to the setpoint color temperature $CCT_{SET}$), the process 700 may exit without adjusting the color temperature value $CCT_{FIXTURE}$ of any of the lighting control devices in the respective lighting fixtures.

Figure 8:
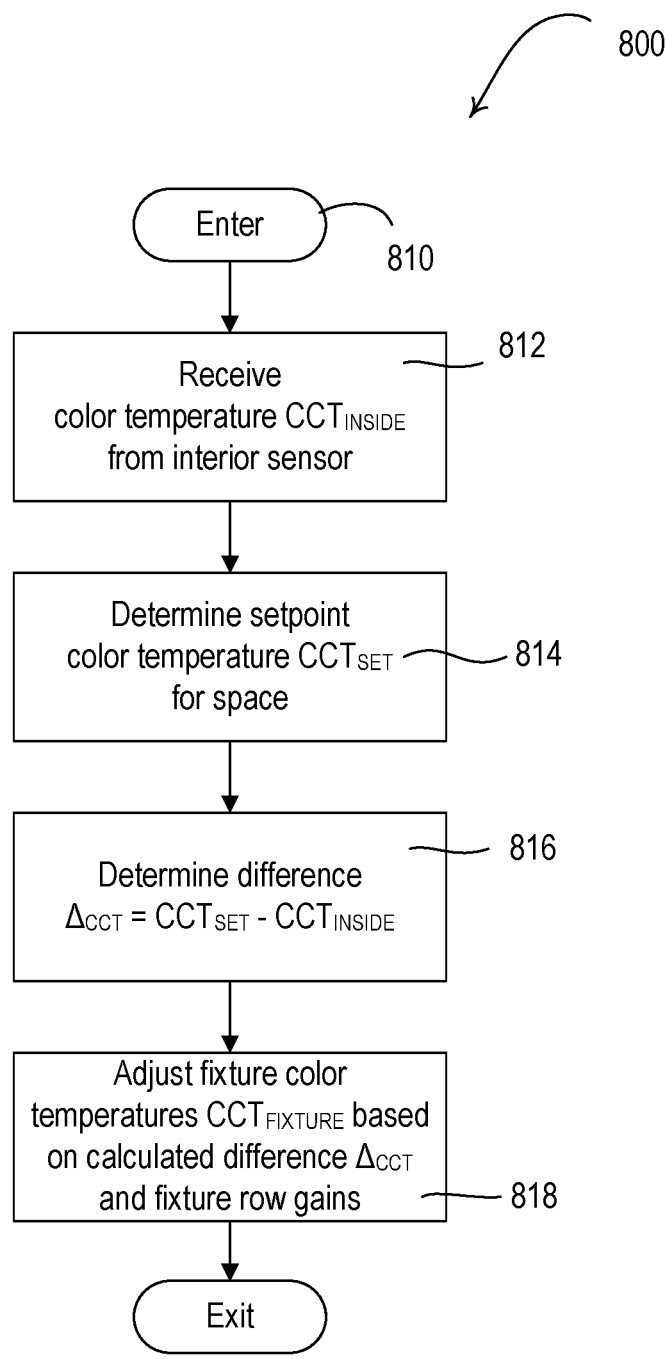
FIG. 8 is a flowchart of an example process for controlling a color temperature of light emitted by a lighting fixture in a space based on an interior color temperature from an interior color temperature sensor.

FIG. 8 is a flowchart of an example process 800 for controlling a color temperature of light emitted by a lighting fixture in a space based on an interior color temperature $CCT_{INSIDE}$ that may be determined by an interior color temperature sensor. As the color temperature $CCT_{FIXTURE}$ of the light emitted by each of the lighting fixtures may be controlled based on measurements performed by an interior color temperature sensor, the control of the lighting fixture may be a closed-loop color control. The process 800 may be performed at a single device, or distributed across multiple devices. For example, the process 800 may be performed at a system controller, a mobile user device, a sensor, a load control device, and/or another computing device. Though the process 800 may be described with reference to a certain device, such as the system controller or a lighting control device within a lighting fixture, one or more other devices in the load control system may be implemented to perform similar functionality.

As shown in FIG. 8, the process 800 may begin at 810. At 812, the color temperature $CCT_{INSIDE}$ of the light inside the space may be received from an interior color temperature sensor (e.g., the room color temperature sensor 180). The interior color temperature sensor may be located inside the space, but external to the lighting fixtures. The interior color temperature sensor may identify the color temperature $CCT_{INSIDE}$ inside the space, which may be influenced by the color temperature $CCT_{FIXTURE}$ of the light emitted by the lighting fixtures. The color temperature $CCT_{INSIDE}$ inside the space may be influenced by the color temperature $CCT_{ENTER}$ of the light that is entering the space (e.g., when the shades are open or have an openness factor or color that allows outside light to enter the space). In addition, the color temperature $CCT_{INSIDE}$ of the light inside the space may be determined from one of a plurality of color temperature sensors in the space (e.g., one of the fixture color temperature sensors 160-166). Further, the color temperature $CCT_{INSIDE}$ of the light inside the space may be determined by processing (e.g., averaging) color temperatures determined by multiple color temperature sensors (e.g., the fixture color temperature sensors 160-166).

A setpoint color temperature $CCT_{SET}$ (e.g., a desired color temperature) may be determined for the space (e.g., retrieved from memory) at 814. Each of the lighting control devices in the space may adjust the color temperature $CCT_{FIXTURE}$ of the light emitted by the respective lighting fixtures to attempt to control the color temperature $CCT_{INSIDE}$ of the light inside the space towards the setpoint color temperature $CCT_{SET}$. At 816, a color temperature difference $\Delta_{CCT}$ may be determined using the setpoint color temperature $CCT_{SET}$ and the color temperature $CCT_{INSIDE}$ inside the space. The color temperature difference $\Delta_{CCT}$ may be the difference between the setpoint color temperature $CCT_{SET}$ and the color temperature $CCT_{INSIDE}$ inside the space. The color temperature value $CCT_{FIXTURE}$ of the lighting control devices in the respective lighting fixtures may be adjusted, at 818, based on the color temperature difference $\Delta_{CCT}$ between the setpoint color temperature $CCT_{SET}$ and the color temperature inside the space $CCT_{INSIDE}$. For example, the color temperature value $CCT_{FIXTURE}$ of the lighting control devices in the respective lighting fixtures may be increased or decreased by the color temperature difference $\Delta_{CCT}$ to compensate for the difference.

As a given space may be affected by multiple lighting fixtures, the color temperature value $CCT_{FIXTURE}$ of the lighting control devices in multiple lighting fixtures may be adjusted, at 818. The adjustment may be based on the location of the fixture within the space and the effect of the color temperature of the light entering the space $CCT_{ENTER}$. For example, fixture row gains (e.g., which may be predefined values) may be added to the color temperature difference $\Delta_{CCT}$ for lighting fixtures in rows of fixtures in a space that are further away from the windows. When a given space is affected by the color temperature of the light emitted by multiple fixtures, the change in color temperature for a given lighting fixture may take into consideration changes in color temperature performed by other lighting fixtures that are affecting the same space.

Figure 9:
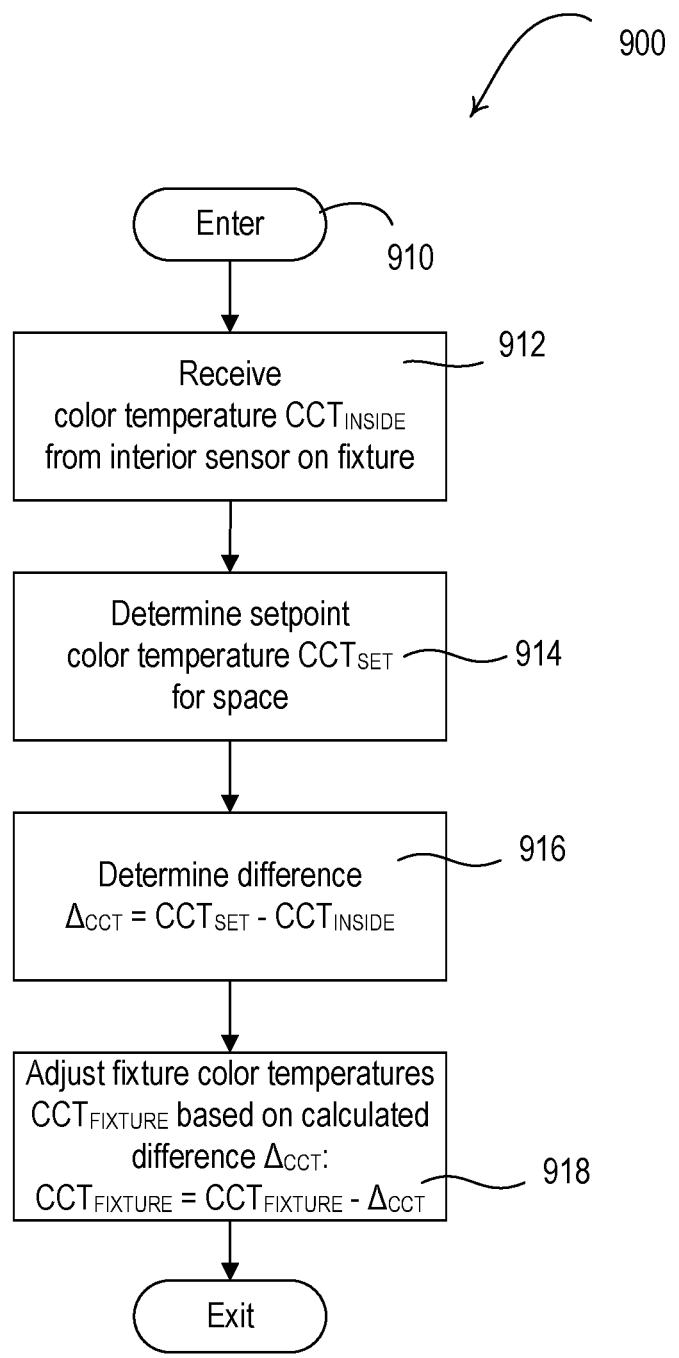
FIG. 9 is a flowchart of another example process for controlling a color temperature of light emitted by a lighting fixture in a space based on an interior color temperature from an interior color temperature sensor.

FIG. 9 is a flowchart of another example process 900 for controlling a color temperature $CCT_{FIXTURE}$ of light emitted by a lighting fixture in a space based on an interior color temperature $CCT_{INSIDE}$ from an interior color temperature sensor. As the color temperature $CCT_{FIXTURE}$ of the light emitted by each of the lighting fixture may be controlled based on measurements performed by an interior color temperature sensor, which may be located in the lighting fixture itself, the control of the lighting fixture may be a closed-loop color control. The process 900 may be performed at a single device, or distributed across multiple devices. For example, the process 900 may be performed at a system controller, a mobile user device, a sensor, a load control device, and/or another computing device. Though the process 900 may be described with reference to a certain device, such as the system controller or a load control device, one or more other devices in the load control system may be implemented to perform similar functionality.

As shown in FIG. 9, the process 900 may begin at 910. At 912, the color temperature $CCT_{INSIDE}$ of the light inside the space may be received from an interior color temperature sensor (e.g., one of the fixture color temperature sensors 160-166). The interior color temperature sensor may be inside the space and located on or adjacent to the lighting fixture (e.g., the lighting fixture being controlled). The interior color temperature sensor may identify the color temperature $CCT_{INSIDE}$ inside the space (e.g., the color temperature of the light at the respective lighting fixture), which may be influenced by the color temperature $CCT_{FIXTURE}$ of the light emitted by the lighting fixtures. The color temperature $CCT_{INSIDE}$ of the light inside the space may be influenced by the color temperature $CCT_{ENTER}$ of the light that is entering the space (e.g., when the shades are open or have an openness factor or color that allows outside light to enter the space).

A setpoint color temperature $CCT_{SET}$ (e.g., a desired color temperature) may be determined for the space (e.g., retrieved from memory) at 914. At 916, a color temperature difference $\Delta_{CCT}$ may be determined using the setpoint color temperature $CCT_{SET}$ and the color temperature $CCT_{INSIDE}$ of the light inside the space (e.g., as measured by the respective fixture color temperature sensor 160-166). The color temperature difference $\Delta_{CCT}$ may be the difference between the setpoint color temperature $CCT_{SET}$ and the color temperature $CCT_{INSIDE}$ inside the space (e.g., the color temperature of the light at the respective lighting fixture). Since the color temperature $CCT_{INSIDE}$ of the light inside the space is measured by each of the fixture color temperature sensors that are mounted to the respective lighting fixtures in the space, a different color temperature difference $\Delta_{CCT}$ may be determined for each lighting fixture. The color temperature $CCT_{FIXTURE}$ of the lighting control device in the respective lighting fixture may be adjusted, at 918, based on the color temperature difference $\Delta_{CCT}$ between the setpoint color temperature $CCT_{SET}$ and the color temperature $CCT_{INSIDE}$ inside the space $CCT_{INSIDE}$ (e.g., the color temperature of the light at the respective lighting fixture). For example, the color temperature $CCT_{FIXTURE}$ of the lighting control device in the respective lighting fixture may be increased or decreased by the color temperature difference $\Delta_{CCT}$ to compensate for the difference (e.g., $CCT_{FIXTURE} = CCT_{FIXTURE} - \Delta_{CCT}$). Accordingly, when the space has multiple lighting fixtures, the lighting control device of each lighting fixture may be controlled to a different color temperature $CCT_{FIXTURE}$ depending upon the color temperature $CCT_{INSIDE}$ of the light inside the space as measured the respective fixture color temperature sensor.

Figure 10:
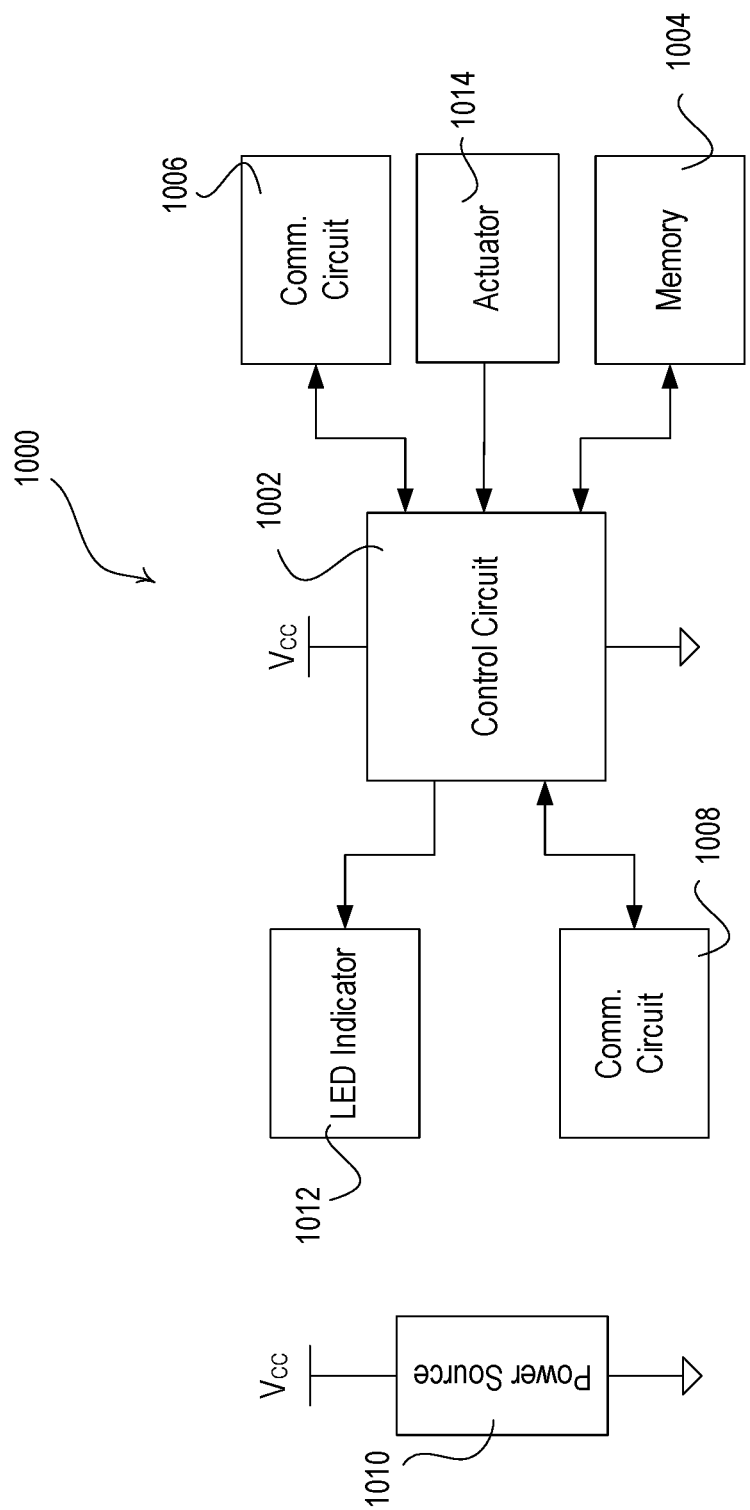
FIG. 10 is a block diagram illustrating an example system controller.

FIG. 10 is a block diagram illustrating an example system controller 1000 (such as system controller 110, described herein). The system controller 1000 may include a control circuit 1002 for controlling the functionality of the system controller 1000. The control circuit 1002 may include one or more general purpose processors, special purpose processors, conventional processors, digital signal processors (DSPs), microprocessors, integrated circuits, a programmable logic device (PLD), application specific integrated circuits (ASICs), or the like. The control circuit 1002 may perform signal coding, data processing, image processing, power control, input/output processing, color temperature processing, or any other functionality that enables the system controller 1000 to perform as described herein.

The control circuit 1002 may store information in and/or retrieve information from the memory 1004. The memory 1004 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 1000 may include a communications circuit 1006 for transmitting and/or receiving information. The communications circuit 1006 may perform wireless and/or wired communications. The system controller 1000 may also, or alternatively, include a communications circuit 1008 for transmitting and/or receiving information. The communications circuit 1008 may perform wireless and/or wired communications. Communications circuits 1006 and 1008 may be in communication with control circuit 1002. The communications circuits 1006 and 1008 may include RF transceivers or other communications modules capable of performing wireless communications via an antenna. The communications circuit 1006 and communications circuit 1008 may be capable of performing communications via the same communication channels or different communication channels. For example, the communications circuit 1006 may be capable of communicating (e.g., with a network device, over a network, etc.) via a wireless communication channel (e.g., BLUETOOTH®, near field communication (NFC), WIFI®, WI-MAX®, cellular, etc.) and the communications circuit 1008 may be capable of communicating (e.g., with control devices and/or other devices in the load control system) via another wireless communication channel (e.g., WI-FI®, Zigbee®, Thread® or a proprietary communication channel, such as Clear Connect®).

The control circuit 1002 may be in communication with an LED indicator 1012 for providing indications to a user. The control circuit 1002 may be in communication with an actuator 1014 (e.g., one or more buttons) that may be actuated by a user to communicate user selections to the control circuit 1002. For example, the actuator 1014 may be actuated to put the control circuit 1002 in an association mode and/or communicate association messages from the system controller 1000.

Each of the modules within the system controller 1000 may be powered by a power source 1010. The power source 1010 may include an AC power supply or DC power supply, for example. The power source 1010 may generate a supply voltage Vcc for powering the modules within the system controller 1000.

Figure 11:
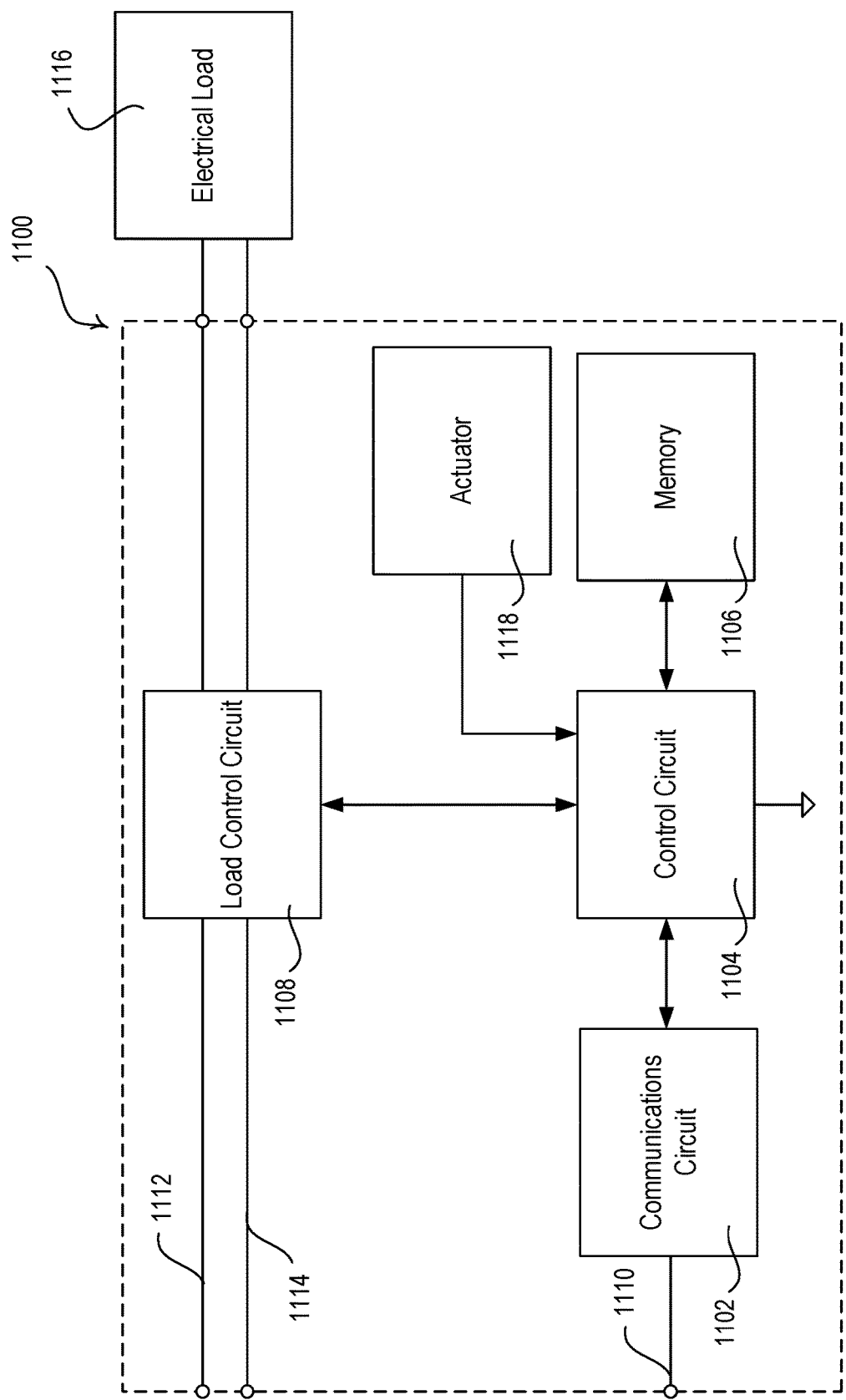
FIG. 11 is a block diagram illustrating an example control-target device.

FIG. 11 is a block diagram illustrating an example control-target device, e.g., a load control device 1100, as described herein. The load control device 1100 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The load control device 1100 may include a communications circuit 1102. The communications circuit 1102 may include a receiver, an RF transceiver, or other communications module capable of performing wired and/or wireless communications via communications link 1110. For example, the communications circuit 1102 may be capable of communicating (e.g., with a network device, over a network, etc.) via a wireless communication channel (e.g., BLUETOOTH®, near field communication (NFC), WIFI®, WI-MAX®, cellular, WI-FI®, Zigbee®, Thread® or a proprietary communication channel, such as Clear Connect®).

The communications circuit 1102 may be in communication with control circuit 1104. The control circuit 1104 may include one or more general purpose processors, special purpose processors, conventional processors, digital signal processors (DSPs), microprocessors, integrated circuits, a programmable logic device (PLD), application specific integrated circuits (ASICs), or the like. The control circuit 1104 may perform signal coding, data processing, power control, input/output processing, image processing, color temperature processing, or any other functionality that enables the load control device 1100 to perform as described herein.

The control circuit 1104 may store information in and/or retrieve information from the memory 1106. For example, the memory 1106 may maintain a registry of associated control devices and/or control instructions. The memory 1106 may include a non-removable memory and/or a removable memory.

The load control circuit 1108 may receive instructions from the control circuit 1104 and may control the electrical load 1116 based on the received instructions. For example, the electrical load 1116 may control an electric motor for controlling a motorized window treatment (e.g., motorized window treatments 150a, 150b) or a lighting load (e.g., LED, fluorescent bulb, etc.). The load control device 1100 may include multiple load control circuits and/or multiple electrical loads for controlling multiple loads, such as multiple LEDs with multiple LED drivers. The load control circuit 1108 may send status feedback to the control circuit 1104 regarding the status of the electrical load 1116. The load control circuit 1108 may receive power via the hot connection 1112 and the neutral connection 1114 and may provide an amount of power to the electrical load 1116. The electrical load 1116 may include any type of electrical load.

The control circuit 1104 may be in communication with an actuator 1118 (e.g., one or more buttons) that may be actuated by a user to communicate user selections to the control circuit 1104. For example, the actuator 1118 may be actuated to put the control circuit 1104 in an association mode and/or communicate association messages from the load control device 1100.

Figure 12:
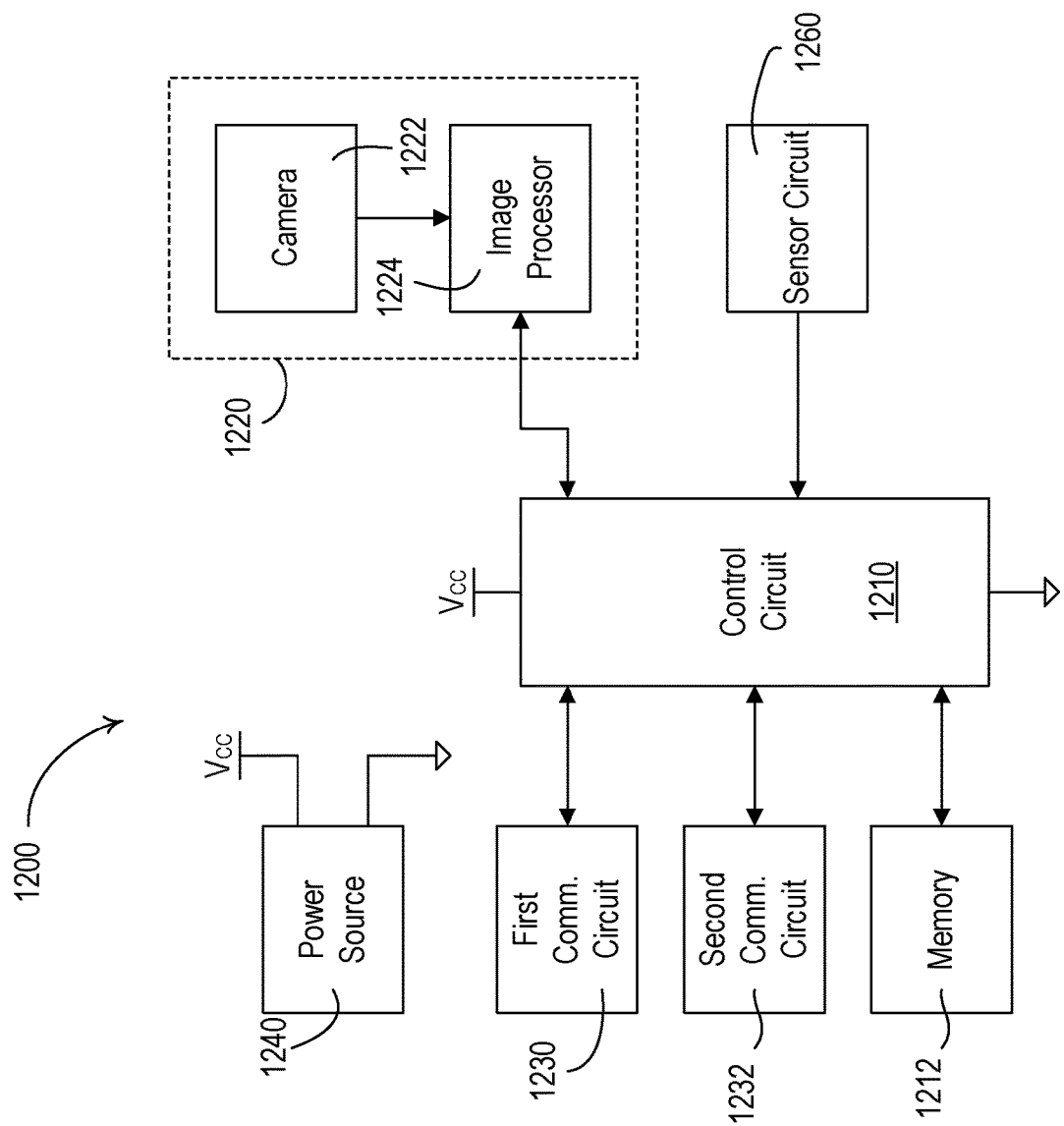
FIG. 12 is a block diagram of an example color temperature sensor.

FIG. 12 is a simplified block diagram of an example color temperature sensor 1200. The color temperature sensor 1200 may comprise a control circuit 1210, for example, a microprocessor, a programmable logic device (PLD), a microcontroller, an application specific integrated circuit (ASIC), a field-programmable gate array (FPGA), or any suitable processing device. The control circuit 1210 may be coupled to a memory 1212 for storage of sensor information (e.g., images, color temperature measurements, operational characteristics, associated devices, etc.). The memory 1212 may be implemented as an external integrated circuit (IC) or as an internal circuit of the control circuit 1210.

The color temperature sensor 1200 may comprise a visible light sensing circuit 1220 having an image recording circuit, such as a camera 1220, and an image processing circuit, such as a processor 1224. The image processor 1224 may comprise a digital signal processor (DSP), a microprocessor, a programmable logic device (PLD), a microcontroller, an application specific integrated circuit (ASIC), a field-programmable gate array (FPGA), or any suitable processing device. The camera 1222 may be positioned towards a space in which one or more environmental characteristics are to be sensed in a space (e.g., into the room 102) or outside of a space (e.g., outside a window). The camera 1222 may be configured to capture or record an image. For example, the camera 1222 may be configured to capture images at a particular sampling rate, where a single image may be referred to as a frame acquisition. One example frame acquisition rate is approximately ten frames per second. Each image may consist of an array of pixels, where each pixel has one or more values associated with it. A raw RGB image may have three values for each pixel: one value for each of the red, green, and blue intensities, respectively. One implementation may use the existing RGB system for pixel colors, where each component of the intensity has a value from 0-255. For example, a red pixel would have an RGB value of (255, 0, 0), whereas a blue pixel would have an RGB value of (0, 0, 255). Any given pixel that is detected to be a combination of red, green, and/or blue may be some combination of (0-255, 0-255, 0-255). Over representations for an image may be used.

The camera 1222 may provide the captured image (e.g., a raw image) to the image processor 1224. The image processor 1224 may be configured to process the image and provide to the control circuit 1210 one or more sense signals that are representative of the sensed environmental characteristics (e.g., a light intensity, a light color, an amount of direct sunlight penetration, etc.). For example, the one or more sense signals provided to the control circuit 1210 may be representative of a measured light level and/or color temperature in the space.

The image processor 1224 may provide a raw image or a processed (e.g., preprocessed) image to the control circuit 1210, which may be configured to process the image to determine sensed environmental characteristics. Regardless, the control circuit 1210 may then use the sensed environmental characteristics to transmit control commands to load control devices (e.g., directly or through system controller 110).

The color temperature sensor 1200 may comprise a first communication circuit 1230 configured to transmit and receive digital messages via a first communication link using a first protocol. For example, the first communication link may comprise a wireless communication link and the first communication circuit 1230 may comprise an RF transceiver coupled to an antenna. In addition, the first communication link may comprise a wired digital communication link and the first communication circuit 330 may comprise a wired communication circuit. The first protocol may comprise a proprietary protocol, such as the ClearConnect protocol, or another protocol, such as the Zigbee® protocol, Thread® protocol, or another wireless protocol. The control circuit 1210 may be configured to transmit an indication of the sensed environmental characteristic via the first communication link during normal operation. For example, the control circuit 1210 may be configured to transmit an indication of a measured environmental characteristic (e.g., a measured light level and/or color temperature) via the first communication link during normal operation.

The color temperature sensor 1200 may comprise a second communication circuit 1232 configured to transmit and receive digital messages via a second communication link using a second protocol. For example, the second communication link may comprise a wireless communication link and the second communication circuit 1232 may comprise an RF transceiver coupled to an antenna. In addition, the second communication link may comprise a wired digital communication link and the second communication circuit 1232 may comprise a wired communication circuit. The second protocol may comprise a standard protocol, such as, for example, the Wi-Fi protocol, the Bluetooth protocol, the Zigbee protocol, etc. The control circuit 1210 may be configured to transmit and receive digital messages via the second communication link.

The color temperature sensor 1200 may comprise a power source 1240 for producing a DC supply voltage Vcc for powering the circuits of the color temperature sensor 1200. The power source 1240 may comprise a power supply configured to receive an external supply voltage from an external power source (e.g., an AC mains line voltage power source and/or an external DC power supply). The power source 1240 may comprise a battery for powering the circuitry of the visible light sensor 1200.

The color temperature sensor 1200 may further comprise a sensor circuit 1260. The sensor circuit 1260 may be low-power occupancy sensing circuit, such as a passive infrared (PIR) detector circuit for detecting an occupancy and/or vacancy condition in the space in response to detected passive infrared energy in the space, a photosensor for detecting outside light in the space, and/or a spectrum sensor for detecting different color temperatures across the color spectrum.

Figure 13:
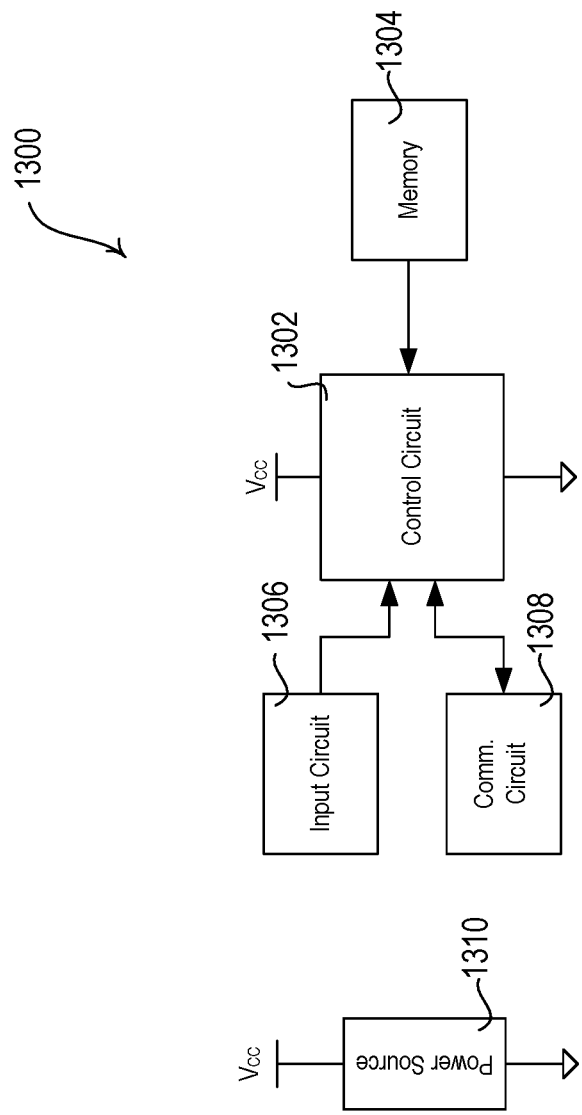
FIG. 13 is a block diagram illustrating an example control-source device.

FIG. 13 is a block diagram illustrating an example control-source device 1300 as described herein. The control-source device 1300 may be a remote control device, an occupancy sensor, an outside light sensor, a temperature sensor, and/or the like. The control-source device 1300 may include a control circuit 1302 for controlling the functionality of the control-source device 1300. The control circuit 1302 may include one or more general purpose processors, special purpose processors, conventional processors, digital signal processors (DSPs), microprocessors, integrated circuits, a programmable logic device (PLD), application specific integrated circuits (ASICs), or the like. The control circuit 1302 may perform signal coding, data processing, power control, input/output processing, or any other functionality that enables the control-source device 1300 to perform as described herein.

The control circuit 1302 may store information in and/or retrieve information from the memory 1304. The memory 1304 may include a non-removable memory and/or a removable memory, as described herein.

The control-source device 1300 may include a communications circuit 1308 for transmitting and/or receiving information. The communications circuit 1308 may transmit and/or receive information via wired and/or wireless communications. The communications circuit 1308 may include a transmitter, an RF transceiver, or other circuit capable of performing wired and/or wireless communications. The communications circuit 1308 may be in communication with control circuit 1302 for transmitting and/or receiving information.

The control circuit 1302 may also be in communication with an input circuit 1306. The input circuit 1306 may include an actuator (e.g., one or more buttons) or a sensor circuit (e.g., an occupancy sensor circuit, an outside light sensor circuit, or a temperature sensor circuit) for receiving input that may be sent to a device for controlling an electrical load. For example, the control-source device may receive input from the input circuit 1306 to put the control circuit 1302 in an association mode and/or communicate association messages from the control-source device. The control circuit 1302 may receive information from the input circuit 1306 (e.g., an indication that a button has been actuated or sensed information). Each of the modules within the control-source device 1300 may be powered by a power source 1310.

Figure 14:
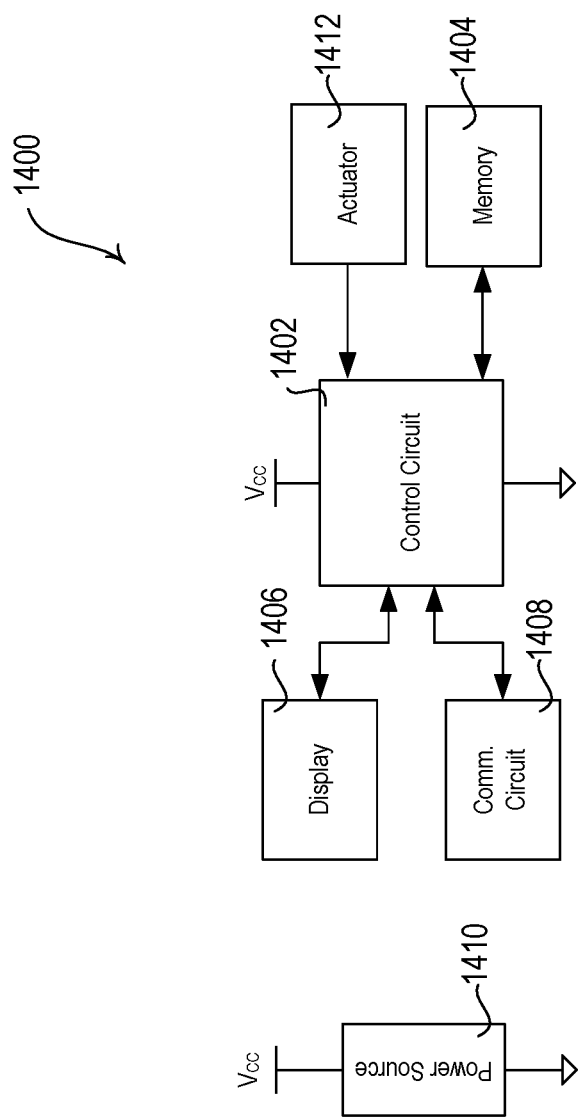
FIG. 14 is a block diagram illustrating an example network device.

FIG. 14 is a block diagram illustrating an example network device 1400 as described herein. The network device 1400 a mobile user device. The network device 1400 may include a control circuit 1402 for controlling the functionality of the network device 1400. The control circuit 1402 may include one or more general purpose processors, special purpose processors, conventional processors, digital signal processors (DSPs), microprocessors, integrated circuits, a programmable logic device (PLD), application specific integrated circuits (ASICs), or the like. The control circuit 1402 may perform signal coding, data processing, power control, input/output processing, or any other functionality that enables the network device 1400 to perform as described herein. The control circuit 1402 may store information in and/or retrieve information from the memory 1404. The memory 1404 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 1400 may include a communications circuit 1408 for transmitting and/or receiving information. The communications circuit 1408 may perform wireless and/or wired communications. The communications circuit 1408 may include an RF transceiver or other circuit capable of performing wireless communications via an antenna. Communications circuit 1408 may be in communication with control circuit 1402 for transmitting and/or receiving information.

The control circuit 1402 may also be in communication with a display 1406 for providing information to a user. The processor 1402 and/or the display 1406 may generate GUIs for being displayed on the network device 1400. The display 1406 and the control circuit 1402 may be in two-way communication, as the display 1406 may include a touch screen module capable of receiving information from a user and providing such information to the control circuit 1402. The network device 1400 may also include an actuator 1412 (e.g., one or more buttons) that may be actuated by a user to communicate user selections to the control circuit 1402.

Each of the modules within the network device 1400 may be powered by a power source 1410. The power source 1410 may include an AC power supply or DC power supply, for example. The power source 1410 may generate a supply voltage Vcc for powering the modules within the network device 1400.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed:

1. A method of controlling color temperature in a space, the method comprising:
    positioning a window treatment fabric of a motorized window treatment in the space in an initial position based on at least one of: a control mode or a user preference;
    selecting one of a plurality of color temperature thresholds;
    determining a color temperature of outside light entering the space;
    comparing the selected color temperature threshold and the color temperature of outside light entering the space; and
    if the selected color temperature threshold and the color temperature of outside light entering the space are not the same:
        determining a new position of the window treatment fabric of the motorized window treatment to adjust the color temperature of the outside light entering in the space;
        transitioning the window treatment fabric of the motorized window treatment from the initial position to the determined new position; and
        adjusting the color temperature of light emitted by one or more lighting fixtures in the space.

2. The method of claim 1, wherein the color temperature of outside light entering the space is determined based upon a color temperature of outside light outside of the space.

3. The method of claim 2, wherein the color temperature of the outside light outside of the space is measured by an outside color temperature sensor.

4. The method of claim 2, wherein the position of the window treatment fabric of the motorized window treatment is closed when the color temperature of the outside light outside of the space is greater than the color temperature threshold.

5. The method of claim 4, wherein selecting one of a plurality of color temperature thresholds comprises:
    selecting a high color temperature threshold; wherein the position of the window treatment fabric of the motorized window treatment is closed when the color temperature of the outside light outside of the space is less than a low color temperature threshold.

6. The method of claim 2, wherein selecting one of a plurality of color temperature thresholds comprises:
    selecting a first color temperature threshold responsive to the window treatment fabric including a blackout fabric; wherein the position of the window treatment fabric is closed when the color temperature of the outside light outside of the space is greater than the first color temperature threshold.

7. The method of claim 2, wherein selecting one of a plurality of color temperature thresholds comprises:
    selecting a first color temperature threshold responsive to the window treatment fabric including a warm sheer fabric; wherein the position of the window treatment fabric is closed when the color temperature of the outside light entering the space is greater than the second color temperature threshold.

8. The method of claim 1, wherein selecting one of a plurality of color temperature thresholds comprises:
    selecting a first color temperature threshold responsive to the control mode positioning the window treatment fabric; or
    selecting a second color temperature threshold responsive to the user preference positioning the window treatment fabric.

9. The method of claim 1, wherein the color temperature of the outside light entering the space is determined based on the position of the window treatment fabric of the motorized window treatment and at least one characteristic of the window treatment fabric associated with the motorized window treatment.

10. The method of claim 9, wherein the at least one characteristic comprises an openness factor or a color.

11. The method of claim 1, wherein the color temperature of the light emitted by the one or more lighting fixtures is decreased when the color temperature of the outside light entering the space is greater than a setpoint color control temperature.

12. The method of claim 1, wherein the color temperature of the light emitted by the one or more lighting fixtures is increased when the color temperature of the outside light entering the space is less than a setpoint color control temperature.

13. The method of claim 1, wherein at least one of the color temperature of the outside light entering the space or the light emitted by the one or more lighting fixtures is measured by an interior color temperature sensor in the space.

14. The method of claim 13, wherein the interior color temperature sensor is located on the lighting fixture.

15. A system controller comprising:
a control circuit configured to:
- position a window treatment fabric of a motorized window treatment in a space in an initial position based on at least one of: a control mode or a user preference;
- select one of a plurality of color temperature thresholds for the space;
- determine a color temperature of outside light entering the space;
- compare the selected color temperature threshold and the color temperature of outside light entering the space; and
- if the selected color temperature of outside light entering the space are not the same:
  - determine a new position of the window treatment fabric of the motorized window to adjust the color temperature of the outside light entering the space;
  - transition the window treatment fabric of the motorized window treatment from the initial position to the determined new position; and
  - adjust the color temperature of light emitted by one or more lighting fixtures in the space.

16. The system controller of claim 15, wherein the control circuit is configured to control the position of the window treatment fabric of the motorized window treatment based on the selected color temperature threshold and a color temperature of outside light outside of the space.

17. The system controller of claim 16, the system controller further comprising a communication circuit, wherein the control circuit is configured to determine the color temperature of the outside light outside of the space by receiving, via the communication circuit, a signal from an outside color temperature sensor.

18. The system controller of claim 16, wherein the position of the window treatment fabric of the motorized window treatment is closed when the color temperature of the outside light outside of the space is greater than the color temperature threshold.

19. The system controller of claim 18, wherein the selected color temperature threshold is a high color temperature threshold, and wherein the position of the window treatment fabric of the motorized window treatment is closed when the color temperature of the outside light outside of the space is less than a low color temperature threshold.

20. The system controller of claim 16, wherein the window treatment fabric includes a blackout fabric; wherein the position of the window treatment fabric is closed when the color temperature of the outside light outside of the space is greater than the first color temperature threshold.

21. The system controller of claim 16, wherein the window treatment fabric includes a warmer sheer fabric; wherein the position of the window treatment fabric is closed when the color temperature of the outside light outside of the space is greater than the second color temperature threshold.

22. The system controller of claim 15, wherein a first color temperature threshold is selected responsive to the control mode positioning the window treatment fabric in the initial position; and
wherein a second color temperature threshold is selected responsive to the user preference positioning the window treatment fabric in the initial position.

23. The system controller of claim 15, wherein the control circuit is configured to determine the color temperature of the outside light entering the space based on the position of the window treatment fabric of the motorized window treatment and at least one characteristic of window treatment fabric associated with the motorized window treatment.

24. The system controller of claim 23, wherein the at least one characteristic comprises an openness factor or a color.

25. The system controller of claim 15, wherein the control circuit is configured to decrease the color temperature of the light emitted by the one or more lighting fixtures when the color temperature of the outside light entering the space is greater than a setpoint color control temperature.

26. The system controller of claim 25, the system controller further comprising a communication circuit, wherein the control circuit is configured to decrease the color temperature of the light emitted by the one or more lighting fixtures by transmitting a signal via the communication circuit to the one or more lighting fixtures.

27. The system controller of claim 15, wherein the control circuit is configured to increase the color temperature of the light emitted by the one or more lighting fixtures when the color temperature of the outside light entering the space is less than a setpoint color control temperature.

28. The system controller of claim 27, the system controller further comprising a communication circuit, wherein the control circuit is configured to increase the color temperature of the light emitted by the one or more lighting fixtures by transmitting a signal via the communication circuit to the one or more lighting fixtures.

29. The system controller of claim 15, the system controller further comprising a communication circuit, wherein the control circuit is configured to determine at least one of the color temperature of the outside light entering the space or the light emitted by the one or more lighting fixtures by receiving, via the communication circuit, a signal from an interior color temperature sensor in the space.

* * * * *